(12) United States Patent
Yamada

(10) Patent No.: US 8,786,711 B2
(45) Date of Patent: Jul. 22, 2014

(54) IMAGE QUALITY EVALUATION SYSTEM, AND APPARATUS, METHOD AND PROGRAM USED FOR THE EVALUATION SYSTEM

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 1017 days.

(21) Appl. No.: 12/747,308

(22) PCT Filed: Dec. 8, 2008

(86) PCT No.: PCT/JP2008/072241
§ 371 (c)(1),
(2), (4) Date: Jun. 10, 2010

(87) PCT Pub. No.: WO2009/075245
PCT Pub. Date: Jun. 18, 2009

(65) Prior Publication Data
US 2010/0259625 A1    Oct. 14, 2010

(30) Foreign Application Priority Data

Dec. 12, 2007  (JP) ................................ 2007-321065
Apr. 30, 2008  (JP) ................................ 2008-118350

(51) Int. Cl.
*H04N 17/00* (2006.01)
*H04N 17/02* (2006.01)
*H04N 21/434* (2011.01)

(52) U.S. Cl.
CPC ............. *H04N 17/00* (2013.01); *H04N 17/004* (2013.01); *H04N 17/02* (2013.01); *H04N 21/4348* (2013.01)
USPC ............................ 348/189; 348/180; 348/192

(58) Field of Classification Search
CPC ... H04N 17/00; H04N 17/02; H04N 21/4348; H04N 21/44008; H04N 17/004
USPC .................. 348/192, 180, 185, 189; 382/206; 455/226.1, 115.1
See application file for complete search history.

(56) References Cited

U.S. PATENT DOCUMENTS 6,941,023 B2 * 9/2005 Shiraishi ....................... 382/245
7,385,627 B2 * 6/2008 Sugimoto et al. ............. 348/192

FOREIGN PATENT DOCUMENTS

| JP | 2003009186 A | 1/2003 |
| JP | 2003134535 A | 5/2003 |
| JP | 2003319420 A | 11/2003 |
| JP | 2005064679 A | 3/2005 |
| JP | 2005252453 A | 9/2005 |

OTHER PUBLICATIONS

International Search Report for PCT/JP2008/072241 mailed Mar. 3, 2009.
ITU-T J.144, Series J: Cable Networks and Transmission of Television, Sound Programme and Other Multimedia Signals, Measurement of the quality of service, Objective perceptual video quality measurement techniques for digital cable television in the Presence of a full reference, Mar. 2004.

* cited by examiner

*Primary Examiner* — Jefferey Harold
*Assistant Examiner* — Jean W Desir
(74) *Attorney, Agent, or Firm* — Sughrue Mion, PLLC

(57) ABSTRACT

Provided is an image quality evaluation system for evaluating quality of an image. The image quality evaluation system includes bit extraction means and image quality evaluation means. For predetermined data expressing an image frame of a first image, the bit extraction means extracts a predetermined number of bits which is smaller than the number of bits required for expressing one data piece. By using a value expressed by the bit string extracted by the bit extraction means and a value of data equivalent to the data to be extracted from the bit string in a second image, the image quality evaluation means estimates a difference between the first image and the second image and evaluates the image quality of the first to image or the second image.

14 Claims, 9 Drawing Sheets

IMAGE QUALITY EVALUATION SYSTEM, AND APPARATUS, METHOD AND PROGRAM USED FOR THE EVALUATION SYSTEM

This application is the National Phase of PCT/JP2008/072241, filed Dec. 8, 2008, which is based upon and claims the benefit of priority from Japanese patent application No. 2007-321065 filed on Dec. 12, 2007 and Japanese patent application No. 2008-118350 filed on Apr. 30, 2008, the disclosure of which is incorporated herein in its entirety by reference.

APPLICABLE FIELD IN THE INDUSTRY

The present invention relates to an image quality evaluation system of evaluation an image quality of an image, and an image sending apparatus, an image reception apparatus, an image quality evaluation method and an image quality evaluation program used therefor.

BACKGROUND ART

The method of objectively evaluating an image quality of a video picture is roughly divided into three kinds. A first evaluation method is a method of directly comparing an original image with a deteriorated image, thereby to evaluate the image quality. A second evaluation method is a method of evaluating the image quality only from the deteriorated image. A third evaluation method is a method of forwarding a feature of the original image, and evaluating the image quality from this feature and the deteriorated image.

While with the first evaluation method, a specific method of evaluating a perceptual video quality is recommended by ITU-T as described in Non-Patent document 1, the first evaluation method necessitates the original image (the image that is obtained before transmission) in a reception apparatus side for making an evaluation when an evaluation of the image quality of the transmitted image is attempted. However, it is impossible to transmit the original image to the reception apparatus side with the image quality thereof kept as it stands due to an upper limit of a communication band of a transmission path. Thus, a reception terminal side cannot evaluate the image quality of the transmitted image by employing the first evaluation method.

Further, the second evaluation method is an ideal method because the reception apparatus side can evaluate the image quality independently; however, the second evaluation method is difficult to realize because it is hard to separate an original feature of the image from the feature generated due to the deterioration of the image quality when an evaluation of the image quality of the transmitted image is attempted.

On the other hand, there is no necessity for transmitting the original image itself in the third evaluation method because the feature of the original image is transmitted to the reception apparatus side, and the image quality of the transmitted image is estimated based upon this feature. Thus, when the appropriate feature can be transmitted, the evaluation of the image quality, which is performed at a low-bit rate, and yet is highly precise, can be expected.

For example, in Patent document 1, the transmitted image quality monitoring apparatus for evaluating the image quality of the transmitted image by employing the third evaluation method is described. The transmitted image quality monitoring apparatus described in the Patent document 1 divides an input image into blocks each having an arbitrary size, subjects videos within the block to an orthogonal transform, extracts arbitrary orthogonal-transformed frequency component values, and transmits them as a feature. Additionally, in the Patent document 1, the method of, after multiplying the signals in the blocks by a sequence (PN sequence) in which +1 and −1 are generated at random and performing whitening for them, subjecting them to an orthogonal transform, extracting arbitrary frequency components, and transmitting them as a feature is disclosed. The reception apparatus side evaluates the image quality by calculating an error of this frequency component between the original image and the transmitted image, and estimating an error of the entirety of the image.

Patent document 1: JP-P2003-9186A
Non-Patent document 1: ITU-T Recommendation, "J.144 Objective perceptual video quality measurement techniques for digital cable television in the Presence of a full reference", ITU-T Recommendation, 2004

DISCLOSURE OF THE INVENTION

Problems to be Solved by the Invention

A problematic point resides in that the precision in which deterioration of the image quality is estimated declines due to that information amount per one frame of the original image that can be transmitted to the reception apparatus side is limited when an evaluation of the image quality of the image transmitted in a limited transmission path band is attempted.

For example, in the transmitted image quality monitoring apparatus described in the Patent document 1, for each of the extracted frequency components, information of the above frequency component is encoded and transmitted. For this, with the limited transmission path band, information amount (herein, the number of the frequency components) that can be extracted per one frame of the image is limited, and thus, the precision at which the deterioration of the image quality is estimated declines. Additionally, the Patent document 1 describes the effect that only the amplitude value is taken out when the arbitrary frequency component value is taken out after the orthogonal transform. However, this means only that the transmission amount can be curtailed as compared with that case of taking out a real part and an imaginary part as frequency component information, and for example, it is not said positively that the information amount of the original image that can be recognized in the reception apparatus side is augmented as compared with the method of arbitrarily taking out pixel information expressed with a real number and transmitting it as a feature.

Thereupon, an object of the present invention is to make a configuration so that the image quality of the transmitted image can be evaluated at a high precision also under a constant limit to the transmission path band.

Means to Solve the Problem

The present invention is characterized in that an image quality evaluation system for evaluating an image quality of an image, comprising: a bit extraction means for, for predetermined data expressive of an image frame of a first image, extracting predetermined bits of which a bit number is fewer than the bit number necessary for expressing the above data per one piece of data; and an image quality evaluation means for, based upon the value being expressed with bit sequences extracted by said bit extraction means, and the value of data equivalent to the data that has become a target of extracting the above bit sequences in a second image, estimating a difference between said first image and said second image, thereby to evaluate the image quality of said first image or second image.

In addition, the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising: a bit extraction means for, for predetermined data expressive of an image frame of an original image, extracting predetermined bits of which a bit number is fewer than the bit number necessary for expressing the above data per one piece of data; and a feature transmission means for transmitting the value being expressed with bit sequences extracted by said bit extraction means as a feature of said original image to an image reception apparatus, being a transmission destination of said encoded image.

In addition, the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising an image quality evaluation means for estimating a difference between the original image and the transmitted image based upon the value being expressed with bit sequences that are obtained by extracting predetermined bits for predetermined data expressive of an image frame of said transmitted image, said value received as a feature of the transmitted image, and the value of data equivalent to the data that has become a target of extracting the above bit sequences in the image frame of the original image, thereby to evaluate an image quality of the transmitted image.

In addition, the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising: a bit extraction means for, for predetermined data expressive of an image frame of a decoded image that is obtained by decoding the encoded image, which is obtained before transmission, extracting predetermined bits of which a bit number is fewer than the bit number necessary for expressing the above data per one piece of data; and a feature transmission means for transmitting the value being expressed with bit sequences extracted by said bit extraction means as a feature of said decoded image to an image reception apparatus, being a transmission destination of said encoded image.

In addition, the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising: a bit extraction means for, for predetermined data expressive of an image frame of a locally-decoded image that is obtained in a course of encoding the original image, extracting predetermined bits of which a bit number is fewer than the bit number necessary for expressing the above data per one piece of data; and a feature transmission means for transmitting the value being expressed with bit sequences extracted by said bit extraction means as a feature of said locally-decoded image to an image reception apparatus, being a transmission destination of said encoded image.

In addition, the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between the original image and the transmitted image based upon the value being expressed with bit sequences that are obtained by extracting predetermined bits for predetermined data expressive of an image frame of said original image, said value received as a feature of the original image, and the value of data equivalent to the data that has become a target of extracting the above bit sequences in the image frame of the transmitted image, thereby to evaluate an image quality of the transmitted image.

In addition, the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between the original image and the transmitted image based upon the value being expressed with bit sequences that are obtained by extracting predetermined bits for predetermined data expressive of an image frame of said original image, said value received as a feature of the original image, and the value of data equivalent to the data that has become a target of extracting the above bit sequences in the image frame of the transmitted image, thereby to evaluate an image quality of the transmitted image.

In addition, the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising: a bit extraction means for, for predetermined data expressive of an image frame of the transmitted image, extracting predetermined bits of which a bit number is fewer than the bit number necessary for expressing the above data per one piece of data; and a feature transmission means for transmitting the value being expressed with bit sequences extracted by said bit extraction means as a feature of said transmitted image to an image sending apparatus, being a transmission source of said encoded image.

In addition, the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between the decoded image and the transmitted image based upon the value being expressed with bit sequences that are obtained by extracting predetermined bits for predetermined data expressive of an image frame of said decoded image, said value received as a feature of the decoded image that is obtained by decoding the encoded image, which is obtained before transmission, and the value of data equivalent to the data that has become a target of extracting the above bit sequences in the image frame of the transmitted image, thereby to evaluate an image quality of the transmitted image.

In addition, the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between a locally-decoded image and the transmitted image based upon the value being expressed with bit sequences that are obtained by extracting predetermined bits for predetermined data expressive of an image frame of said locally-decoded image, said value received as a feature of the locally-decoded image that is obtained in a course of encoding the original image, and the value of data equivalent to the data that has become a target of extracting the above bit sequences in the image frame of the transmitted image, thereby to evaluate an image quality of the transmitted image.

In addition, the present invention is characterized in that an image quality evaluation method of evaluating an image quality of an image, comprising: for predetermined data expressive of an image frame of a first image, extracting predetermined bits of which a bit number is fewer than the bit number necessary for expressing the above data per one piece of data; and based upon the value that is expressed with extracted bit sequences, and the value of data equivalent to the data that has become a target of extracting the above bit sequences in a second image, estimating a difference between said first image and said second image, thereby to evaluate the image quality of said first image or second image.

In addition, the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing the processes of: for predetermined data expressive of an image frame of the original image, extracting predetermined bits of which a bit number is fewer than the bit number necessary for expressing the above data per one piece of data; and transmitting the value being expressed with the extracted bit sequences as a feature of said original image to an image reception apparatus, being a transmission destination of said encoded image.

In addition, the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing a process of estimating a difference between the original image and the transmitted image based upon the value being expressed with bit sequences that are obtained by extracting predetermined bits for predetermined data expressive of an image frame of said transmitted image, said value received as a feature of the transmitted image, and the value of data equivalent to the data that has become a target of extracting the above bit sequences in the image frame of the original image, thereby to evaluate an image quality of the transmitted image.

In addition, the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing the processes of: for predetermined data expressive of an image frame of a decoded image that is obtained by decoding the encoded image, which is obtained before transmission, extracting predetermined bits of which a bit number is fewer than the bit number necessary for expressing the above data per one piece of data; and transmitting the value being expressed with extracted bit sequences as a feature of said decoded image to an image reception apparatus, being a transmission destination of said encoded image.

In addition, the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing the processes of: for predetermined data expressive of an image frame of a locally-decoded image that is obtained in a course of encoding the original image, extracting predetermined bits of which a bit number is fewer than the bit number necessary for expressing the above data per one piece of data; and transmitting the value being expressed with extracted bit sequences as a feature of said locally-decoded image to an image reception apparatus, being a transmission destination of said encoded image.

In addition, the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing a process of estimating a difference between the original image and the transmitted image based upon the value being expressed with bit sequences that are obtained by extracting predetermined bits for predetermined data expressive of an image frame of said original image, said value received as a feature of the original image, and the value of data equivalent to the data that has become a target of extracting the above bit sequences in the image frame of the transmitted image, thereby to evaluate an image quality of the transmitted image.

In addition, the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing the processes of for predetermined data expressive of an image frame of the transmitted image, extracting predetermined bits of which a bit number is fewer than the bit number necessary for expressing the above data per one piece of data and transmitting the value being expressed with extracted bit sequences as a feature of said transmitted image to an image sending apparatus, being a transmission source of said encoded image.

In addition, the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing a process of estimating a difference between a decoded image and the transmitted image based upon the value being expressed with bit sequences that are obtained by extracting predetermined bits for predetermined data expressive of an image frame of said decoded image, said value received as a feature of the decoded image that is obtained by decoding the encoded image, which is obtained before transmission, and the value of data equivalent to the data that has become a target of extracting the above bit sequences in the image frame of the transmitted image, thereby to evaluate an image quality of the transmitted image.

In addition, the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing a process of estimating a difference between a locally-decoded image and the transmitted image based upon the value being expressed with bit sequences that are obtained by extracting predetermined bits for predetermined data expressive of an image frame of said locally-decoded image, said value received as a feature of the locally-decoded image that is obtained in a course of encoding the original image, and the value of data equivalent to the data that has become a target of extracting the above bit sequences in the image frame of the transmitted image, thereby to evaluate an image quality of the transmitted image.

An Advantageous Effect of the Invention

In accordance with the present invention, the image quality of the transmitted image can be evaluated at a high precision also under a constant limit to the transmission path band because only information of which a degree of the influence upon a result of estimating the deterioration of the image quality is small can be reduced without the number of pieces of data reduced that are extracted per one frame.

BRIEF DESCRIPTION OF THE DRAWINGS

DESCRIPTION OF NUMERALS 1 bit extraction means
2 image quality evaluation means
3 data estimation means
21 image sending apparatus
211 image encoding device
212 pixel decimating device
213 bit extraction device
214 extracted pixel information encoding device
215 image decoding device
22 transmission path
23 end user terminal
231 image decoding device
232 extracted pixel information decoding device
233 original image pixel information estimation device
234 image quality estimation device
31 image sending apparatus.
311 image encoding device
312 extracted pixel information decoding device
313 transmitted image pixel information estimation device
314 image quality estimation device
32 transmission path
33 end user terminal
331 image decoding device
332 pixel decimating device
333 bit extraction device
334 extracted pixel information encoding device
40 image sending system
401 program control processor
402 input data buffer
403 output data buffer
404 program memory
414 main program
4141 image encoding processing module
4142 pixel decimating processing module
4143 bit extraction processing module
4144 extracted pixel information encoding processing module
50 end user terminal system
501 program control processor
502 input data buffer
503 output data buffer
504 program memory
514 main program
5141 image decoding processing module
5142 extracted pixel information decoding processing module
5143 original image pixel information estimation processing module
5144 image quality estimation processing module Best Mode For Carrying Out The Invention Hereinafter, the embodiments of the present invention will be explained with a reference to the accompanied drawings.
As shown in FIG. 1, the image quality evaluation system in accordance with the present invention includes a bit extraction means 1 and an image quality evaluation means 2.

Figure 1:
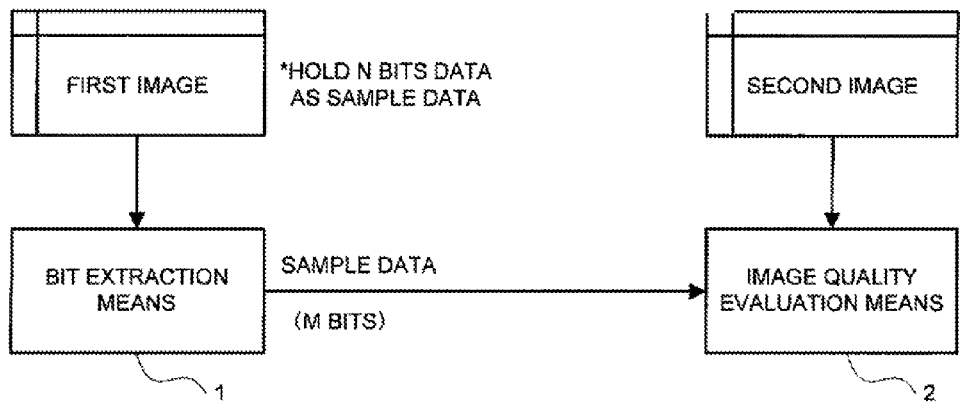
FIG. 1 is a block diagram illustrating a schematic configuration of the image quality evaluation system in accordance with the present invention.

For predetermined data expressive of an image frame of a first image, the bit extraction means 1 extracts predetermined bits of which a bit number is fewer than the bit number necessary for expressing the above data per one piece of the data. Herein, the so-called predetermined data expressive of the image frame of the first image could be, for example, pixel information of a predetermined pixel position in the image frame of the first image. In such a case, for the pixel information such as color by a brightness, a color difference, and an RGB value of a predetermined pixel, the bit extraction means 1 extracts pre-designated bits of which a bit number is fewer than the bit number per one pixel from the image frame of the first image. Additionally, the bit can be also extracted for one of the R value, G value, and B value, or a combination thereof. The data that becomes a target of the bit extraction is not limited to the pixel information, and could be any information so long as the above information is a sample being expressed with a predetermined bit number in a sampled and quantized digital image. For example, it could be information (frequency information) of the frequency component that is obtained by subjecting the pixel information to the orthogonal transform. Further, for example, it could be an average value of the image information by each of the blocks having a predetermined size into which the image frame has been divided, an average value of an absolute value of a difference between each pixel information and the foregoing average value, and a dispersion of the pixel information by each of the blocks having a predetermined size into which the image frame has been divided. Employing the value calculated for each block having a predetermined size in such a manner makes it possible to curtail the information amount of the original image being transmitted. Hereinafter, the data expressive of the image frame that has become a target of extracting the bit sequence is called sample data.

For example, in the image quality evaluation system for evaluating the image quality of the transmitted image that is obtained by decoding the encoded image in which the original image has been encoded in the transmission destination thereof, packaging the bit extraction means 1 in the image sending apparatus for encoding the original image and transmitting the foregoing encoded image allows the bit extraction means 1 to perform the bit extraction with the image frames targeted of the original image, the encoded image of the above original image that is obtained before transmission, the decoded image that is obtained by decoding the above encoded image, and the localized decoded image that is obtained in the course of encoding the original image. Further, for example, packaging the bit extraction means 1 in the image reception apparatus, which obtains the transmitted image by receiving and decoding the encoded image, allows the bit extraction means 1 to perform the bit extraction with the image frames of the transmitted image targeted.

Figure 2:
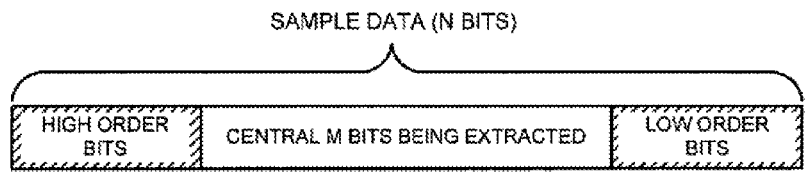
FIG. 2 is an explanatory view illustrating an example of the bit extraction that is performed by a bit extraction means 1.
Figure 12:
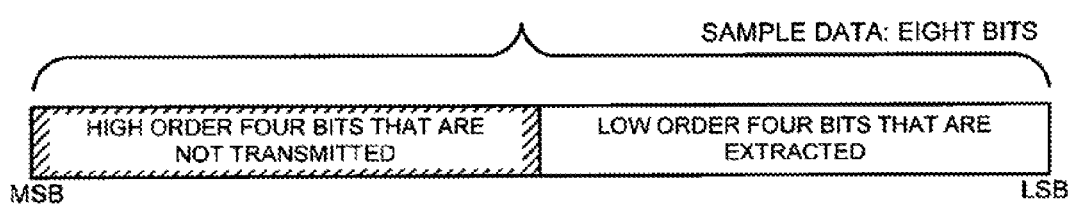
FIG. 12 is an explanatory view illustrating an example of the bit extraction that is performed by the bit extraction means 1.

The bit extraction means 1 is adapted to extract continuous predetermined bits, for example, except for predetermined high order bits, predetermined low order bits or both. FIG. 2 is an explanatory view illustrating an example of the bit extraction that is performed by the bit extraction means 1. As shown in FIG. 2, when the number of the bits of the sample data is N, the bit extraction means 1 extracts only an M-bit portion from predetermined sample date in the image frame of the first image so that N>M is yielded. With the bit position in which M bits are extracted, for example, the bits are extracted in such a manner that progressively high order M bits from a most significant bit are extracted, progressively low order M bits from a least significant bit are extracted, or central M bits are extracted. For example, with the pixel information expressed with eight bits, it is thinkable that central five bits, out of them, except for high order one bit and low order two bits are extracted. As a bit being extracted, the bit that becomes important at the moment of being employed for evaluating the image quality is preferably extracted. For example, when the bit that becomes important is included in the low order bits, a configuration is made so that only the low order bits are extracted, and the high order bits are not transmitted as shown in FIG. 12. FIG. 12 shows an example of not transmitting high order four bits in such sample data being expressed with eight bits per one piece of data, and having important information in the low order bits.

The image quality evaluation means 2 estimates a difference between a first image and a second image based upon the value being expressed with a bit sequence extracted by the bit extraction means 1, and the value of data equivalent to the data that has becomes a target of extracting the above bit sequence in the second image, thereby to evaluate the image quality of the foregoing first image or second image. The image quality evaluation means 2 may obtain, for example, a difference for the bit sequence of the image frame of the first image by employing the bit sequence extracted from the second image with the identical method to estimate a difference between the first image and the second image from the above difference. For example, the image quality evaluation means 2 may estimate a mean square error value obtained from differences of a one-frame portion of the extracted bit sequences as a deteriorated value of the image quality in the entirety of the frame.

Additionally, the image quality evaluation means 2 is packaged, for example, in the image reception apparatus for obtaining the transmitted image by receiving and decoding the encoded image from the image sending apparatus provided with the bit extraction means 1 in the image quality evaluation system for evaluating the image quality of the transmitted image that is obtained by decoding the encoded image in which the original image has been encoded in the transmission destination thereof. In such a case, the image quality evaluation means 2 estimates a difference between the comparison image and the transmitted image by employing the value, which is expressed with the bit sequence received as information indicative of the feature of a comparison image (original image etc.) from the image sending apparatus, and evaluates the image quality of the transmitted image.

Additionally, when the image reception apparatus is provided with the bit extraction means 1, the image quality evaluation means 2 is packaged in the image quality sending apparatus side. In such a case, the image quality evaluation means 2 estimates a difference between the original image and the transmitted image by employing the value, which is expressed with the bit sequence received as information indicative of the feature of the transmitted image from the image reception apparatus, evaluates the image quality of the transmitted image.

In a large number of pieces of the sample data such as the pixel information, an influence upon the image quality estimation result caused by removing the low order bits thereof is small because the information being expressed with the low order bits thereof is such fine information that cannot be detected by sense of sight of human being. On the other hand, there exists a certain degree of correlation between the original image and the evaluation target image (transmitted image) in the information being expressed with the high order bits, whereby a possibility that both have an identical value, respectively, is high. For this, even though the high order bits of the sample data are removed, an influence upon the image quality estimation result is small. This situation is similar not only when the sample data is one of the brightness, the color difference, and the RGB value, but also when it is the information (frequency information) of the frequency component that is obtained by subjecting the pixel information to the orthogonal transform, when it is an average value of the pixel information by each of the blocks having a predetermined size into which the image frame has been divided, when it is an average value of an absolute value of a difference between each pixel information and the foregoing average value, when it is a dispersion of the pixel information by each of the blocks having a predetermined size into which the image frame has been divided, and the like.

While there is the case that a correlation between the original image and the evaluation target image lowers when the deterioration of the image quality caused by a transmission error occurs, a possibility that correlativeness of the high order bit is kept is high because, as a rule, such a process (error concealment process) of making the deterioration inconspicuous is performed for the region in which the deterioration of the image quality occurs when the transmission error occurs. Thus, it can be said safely that even when the transmission error occurs, an influence upon the image quality estimation result caused by removing the high order bits is small. Performing the bit extraction for such a sample data a plural number of times in one frame enables the image quality to be estimated at a high quality.

Figure 3:
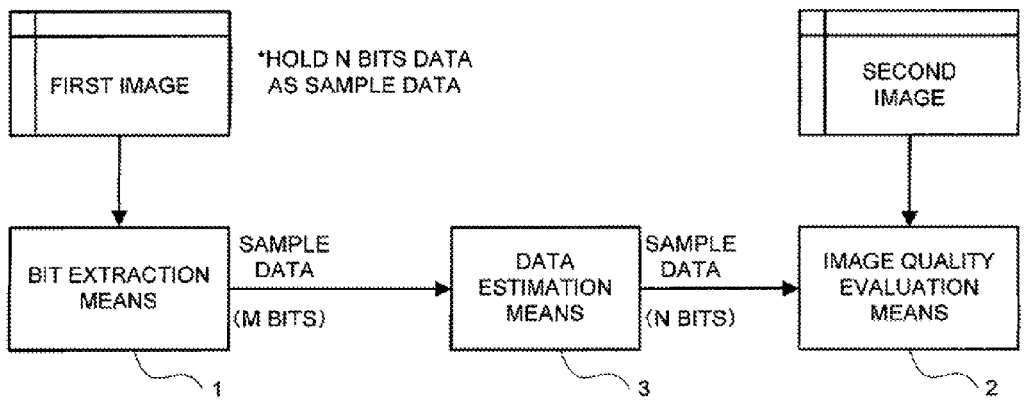
FIG. 3 is a block diagram illustrating another exemplary configuration of the image quality evaluation system in accordance with the present invention.

Additionally, as shown in FIG. 3, by further adding a data estimation means 3, and having it estimate the sample data in the original bit number express from the bit sequence extracted from the first image, a difference between the first image and the second image can be also estimated from a difference between pieces of the sample data (N bits). FIG. 3 is a block diagram illustrating another exemplary configuration of the image quality evaluation system in accordance with the present invention. As shown in FIG. 3, the image quality evaluation system in accordance with the present invention further includes the data estimation means 3.

For the extracted bit sequence, the data estimation means 3 complements the bits not extracted at the moment of gaining the above bit sequence, thereby to estimate the value of predetermined sample data in the first image that has become a target of extracting the above bit sequence. The data estimation means 3 may complement, for example, the not-extracted bits with a pre-decided value (for example, zero), thereby to estimate the value of the sample data of the first image. Further, for example, the data estimation means 3 may complement the not-extracted bits with the value of sample data equivalent to the sample data that has become a target of extracting the above bit sequence in the second image, thereby to estimate the value of the sample data of the first image.

Further, the data estimation means 3 may be adapted to complement the high order bits, out of the not-extracted bits, with the value allowing a difference between the value of the sample data of the first image regarded as an estimation result, and the value of sample data equivalent to the above sample data in the second image to become minimized. Additionally, the exemplary embodiment of this estimation method will be specifically explained as a second embodiment.

Further, the data estimation means 3 may be adapted to complement the low order bits, out of the not-extracted bits, with an average value of the values expressible with the above low order bits. Additionally, the exemplary embodiment of this estimation method will be specifically explained as a third embodiment.

Additionally, the data estimation means 3 may estimate the value of the sample data of the first image with a combination of these methods.

Further, in this image quality evaluation system, the image quality evaluation means 2 estimates a difference between the first image and the second image from a difference between the value (N bits) of the sample data of the first image estimated by the data estimation means 3, and the value (N bits) of the corresponding sample data of the second image.

Further, the image quality evaluation means 2 may estimate a difference between the first image and the second image from the value obtained by further subtracting an average value of an error between the value of the sample data regarded as an estimation result that could be generated due to the low order bits not extracted at the moment of gaining the bit sequence, and the value of the actual sample data from a difference between the calculated pieces of the sample data. Additionally, the exemplary embodiment of this estimation method will be specifically explained as a third embodiment.

Hereinafter, more specific exemplary configurations will be explained.

Embodiment 1

Figure 4:
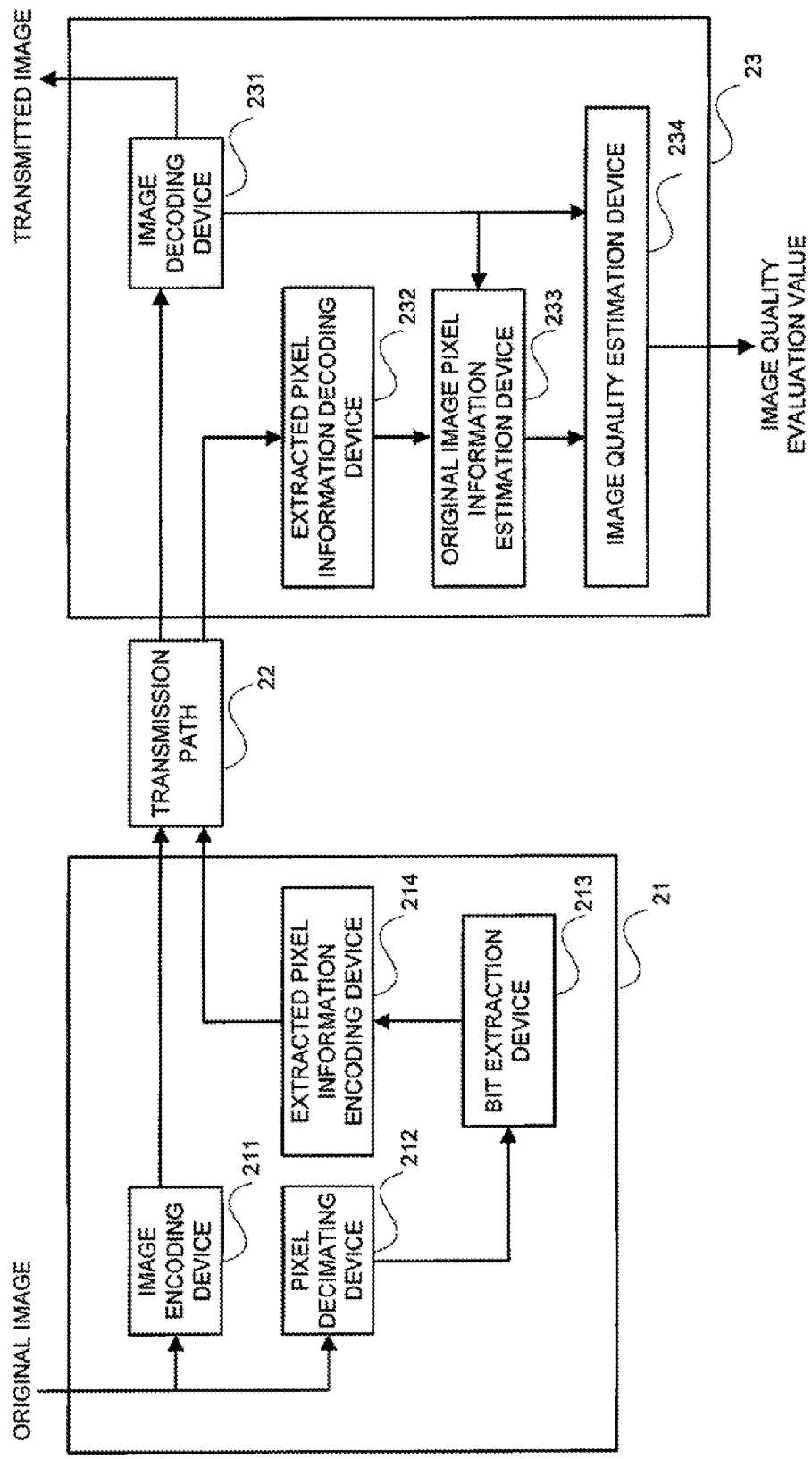
FIG. 4 is a block diagram illustrating an exemplary configuration of the image quality evaluation system in accordance with a first embodiment.

FIG. 4 is a block diagram illustrating an exemplary configuration of the image quality evaluation system in accordance with the first embodiment. The image quality evaluation system shown in FIG. 4 includes an image sending apparatus 21 and an end user terminal 23. Further, the image sending apparatus 21 and the end user terminal 23 are connected to each other via a transmission path 23. Additionally, the image quality evaluation system shown in FIG. 4, which is an image quality evaluation system for evaluating the image quality of the transmitted image that is obtained by decoding the encoded image in which the original image has been encoded in the transmission destination thereof, is an example of the image quality evaluation system for evaluating the image quality of the transmitted image in the end user terminal 23 side (namely, image reception apparatus side).

The image sending apparatus 21 includes an image encoding device 211, a pixel decimating device 212, a bit extraction device 213, and an extracted pixel information encoding device 214. The image sending apparatus 21 is, for example, a server apparatus for delivering moving pictures and still pictures. Additionally, it is assumed that the image sending apparatus 21 includes a communication control apparatus for transmitting/receiving various kinds of the information via the transmission path 22, which is not shown in the figure.

Further, the end user terminal 23 includes an image decoding device 231, an extracted pixel information decoding device 232, an original image pixel information estimation device 233, and an image quality estimation device 234. The end user terminal 23, which is an information processing apparatus for receiving the encoded image of the original image from the image sending apparatus 21, and decoding it, thereby to gain the transmitted image, is, for example, a mobile terminal machine having a network communication function or a personal computer. Additionally, it is assumed that the end user terminal 23 includes a communication control apparatus for transmitting/receiving various kinds of the information via the transmission path 22. which is not shown in the figure.

The image encoding device 211 of the image sending apparatus 21 encodes the inputted image (original image). Additionally, the encoded image encoded by the image encoding device 211 is transmitted via the transmission path 22 to the end user terminal 23 by the communication control apparatus (not shown in the figure) that the image sending apparatus 21 includes.

The pixel decimating device 212 performs the decimating of the pixel for the frame (image frame) of the original image. Additionally, it follows that the pixel information of the pixel left over after the pixel decimating device 212 decimates the pixel is designated to be a bit extraction target as sample data.

The bit extraction device 213 extracts the pre-designated bits for the pixel information (N bits) of each pixel of the original image left over after the decimating by the pixel decimating device 212. Additionally, the bit extraction device 213 is a device for realizing a function of the bit extraction means 1 shown in FIG. 1.

The extracted pixel information encoding device 214 collects a one-frame portion of the extracted pixel information (M bits) of the original image that is comprised of the bit sequences extracted by the bit extraction device 213, and encodes it as a feature of the original image. Additionally, the feature (a one-frame portion of the extracted pixel information (M bits)) of the original image encoded by the extracted pixel information encoding device 214 is transmitted via the transmission path 22 to the end user terminal 23 by the communication control apparatus (not shown in the figure) that the image sending apparatus 21 includes.

The image encoding device 211, the pixel decimating device 212, the bit extraction device 213, and the extracted pixel information encoding device 214 are realized with the information processing apparatus that operates under a program, for example, CPU etc. that the image sending apparatus 12 includes. Additionally, the image encoding device 211 may be realized with a hardware apparatus such as an encoder apparatus.

Further, the image decoding device 231 of the end user terminal 23 decodes the encoded image (encoded image that is obtained by encoding the original image) received from the image sending apparatus 21 via the communication control apparatus. Hereinafter, there is the case that the decoded image that is obtained with decoding performed by the image decoding device 231 is expressed as a received image. Additionally, the so-called received image signifies the transmitted image that becomes an evaluation target image.

The extracted pixel information decoding device 232 decodes the encoded feature information (namely, a one-frame portion of the encoded extracted pixel information (M bits)) of the original image received from the image sending apparatus 21 via the communication control apparatus.

The original image pixel information estimation device 233 estimates the value of the pixel information, being an original bit number expression, from each of pieces of the extracted pixel information (M bits) of the original image obtained with decoding performed by the extracted pixel information decoding device 232. It is assumed that, for the extracted pixel information (M bits) of the original image, this embodiment compliments the low order bits, out of the removed bits, with zero, and the high order bits with the value of the pixel information (N bits) of an identical pixel position in the received image. The original image pixel information estimation device 233 is a device for realizing a function of the data estimation means 3 shown in FIG. 3.

The image quality estimation device 234 estimates the image quality of the transmitted image as against the original image from the pixel information (N bits) of the original image estimated by the original image pixel information estimation device 233 based upon each of pieces of the extracted pixel information (M bits) of the original image, and the image information of the received image. This embodiment estimates a difference between the first image and the second image from a difference between the value of each of pieces of the estimated pixel information (N bits) of original image, and the value of the pixel information (N bits) of the identical pixel position in the received image, thereby to evaluate the image quality of the transmitted image. Additionally, the image quality estimation device 234 is a device for realizing a function of the image quality estimation means 2 shown in FIG. 3. Additionally, when the original image pixel information estimation device 233 is omitted, it is also possible to estimate a difference between the first image and the second image from a difference between the value of each of pieces of the extracted pixel information (M bits) of the original image obtained with the decoding, and the value of the extracted pixel information (M bits) extracted from the received image with the identical method.

The image decoding device 231, the extracted pixel information decoding device 232, the original image pixel information estimation device 233, and the image quality estimation device 234 are specifically realized with the information processing apparatus that operates under a program, for example, CPU etc. that the end user terminal 23 includes. Additionally, the image decoding device 231 may be realized with a hardware apparatus such as a decoder apparatus.

Figure 5:
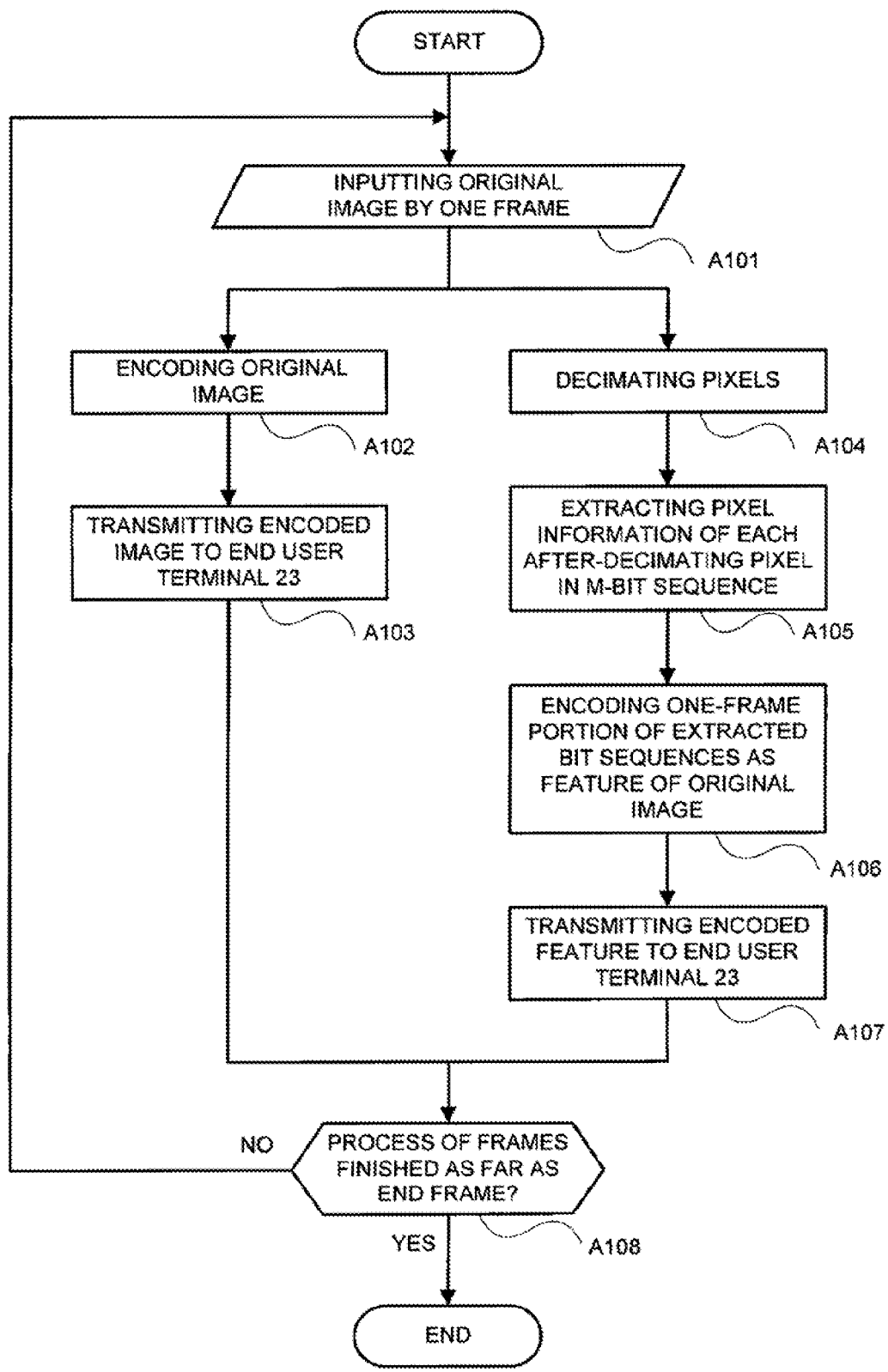
FIG. 5 is a flowchart illustrating an exemplary operation of an image sending apparatus 21 in the first embodiment.
Figure 6:
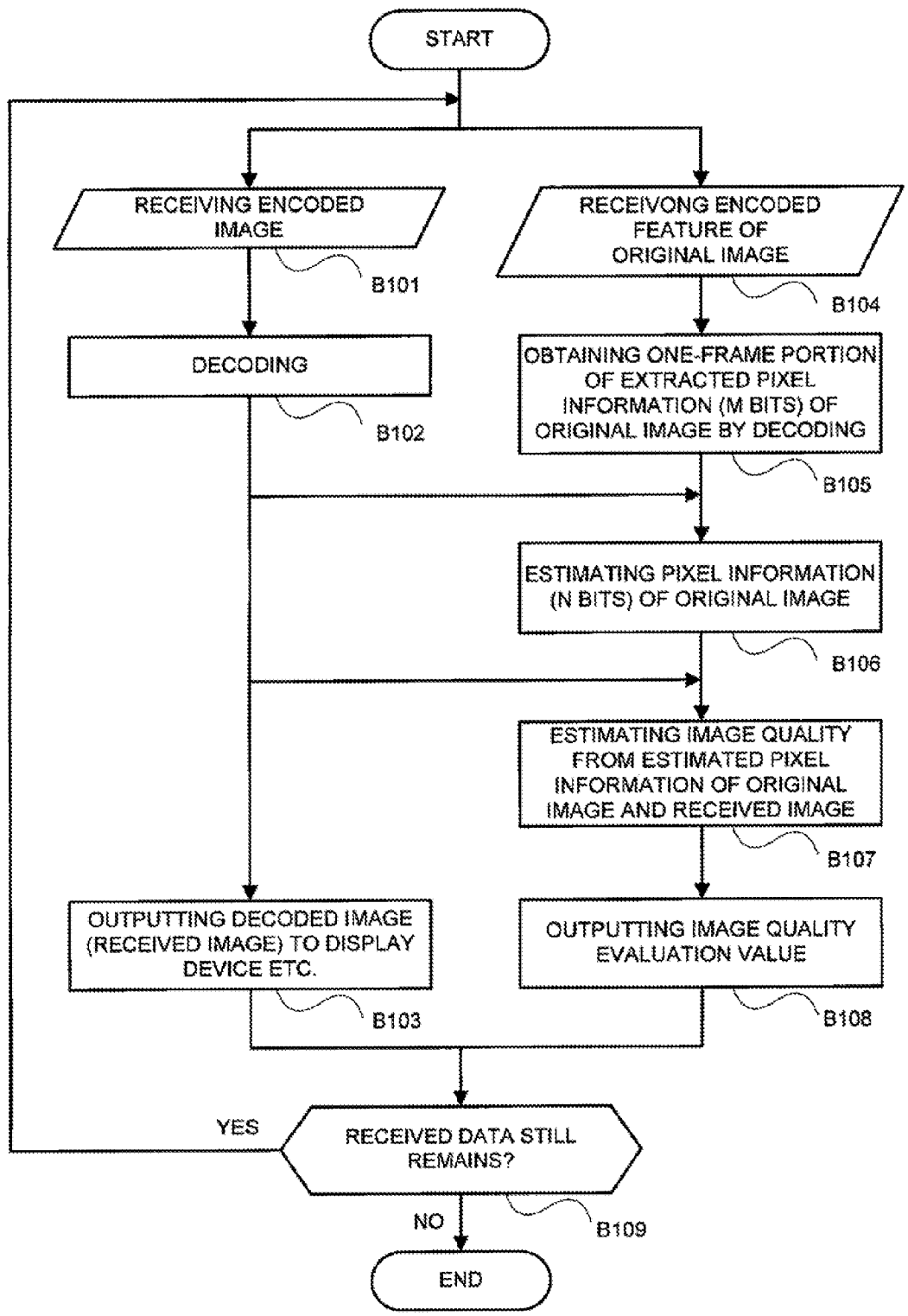
FIG. 6 is a flowchart illustrating an exemplary operation of an end user terminal 23 in the first embodiment.

Next, an operation of this embodiment will be explained with a reference to flowcharts of FIG. 5 and FIG. 6. FIG. 5 is a flowchart illustrating an exemplary operation of the image sending apparatus 21. Further, FIG. 6 is a flowchart illustrating an exemplary operation of the end user terminal 23. Herein, the explanation is made with the case that the image sending apparatus 21, according to a request made by the end user terminal 23, transmits the encoded image of the requested image via the transmission path 22 to the end user terminal 23 exemplified. Additionally, the original image, which becomes a target of the transmission, may be inputted into the image sending apparatus 21 responding to a necessity, and may be stored in a storage apparatus that the image sending apparatus 21 previously includes.

At first, when the original image is inputted into the image sending apparatus 21 (step A101), the image encoding device 211 encodes the inputted original image (step A102). The image encoding device 211 generates compressed image information by transforming the image information for expressing the image with a predetermined transform equation in some cases, and calculating it with a predetermined arithmetic equation in some cases, according to a predetermined encoding technique (for example, MPEG-2, H.264 (MPEG-4 AVC), and so on). More specifically, the image encoding device 211 performs the process such as separation of the frame, acquisition of the difference data, quantization, and multiplexing in some cases. When the original image is encoded, the image sending apparatus 21 transmits the encoded image obtained by encoding the original image to the end user terminal 23 via the transmission path 22 (step A103). The image sending apparatus 21 (more specifically, the communication control apparatus (not shown in the figure) that the image sending apparatus 21 includes) transmits the image information of the encoded image obtained with the encoding of the original image performed by the image encoding device 211 to the end user terminal 23.

The image sending apparatus 21 transmits the feature of the original image of the image (encoded image) to be transmitted, in parallel to the process of transmitting this encoded image. At first, the pixel decimating device 212 performs the process of decimating the pixels for the image frame of the inputted original image (step A104). The pixel decimating device 212 decimates the pixels, for example, with the pre-designated method such as a method of decimating the pixels every 16 pixels both in a horizontal direction and a vertical direction. Further, the pixel decimating device 212 may change an interval at which the pixels are decimated depended upon the location of the frame in such a manner that the pixels are decimated every eight pixels in the central part of the image frame, and are decimated every 16 pixels in the peripheral part. Changing the interval of the decimating in such a manner makes it possible to control the data amount of the feature. Additionally, the interval of the decimating is decided on the basis of the number of pieces of the pixel information that can be extracted per one image frame that is decided based upon the number of the bits necessary for transmitting the feature and the transmission band of the transmission path 22. Needless to say, the decimating may not be performed when there is a margin for the transmission band. Additionally, it is assumed that how to decimate the pixels in the pixel decimating device 212 has become already known to the end user terminal 23 side as well.

Next, the bit extraction device 213 extracts the M bits from the pixel information (N bits) such as the brightness value of each pixel left over after the decimating so that N>M is yielded (step A105). The bit extraction device 213 generates the extracted pixel information, which is expressed with the M bit sequences, by extracting the pixel information (N bits) such as the brightness value of the pixel designated to be a bit extraction target with the decimating from the image information of the original image, and further extracting the pre-designated bits for the above pixel information. Additionally, it is assumed that which M bits, out of N bits, are extracted has become clear to the end user terminal 23 side as well.

When the bit extraction for all of after-decimating pixels within one frame is completed, the extracted pixel information encoding device 214 encodes a one-frame portion of the extracted pixel information (M bits) of the original image as a feature of the original image (step A106). Additionally, it is assumed that the encoding of the feature is performed by employing a reversible encoding method. The extracted pixel information encoding device 214 generates, for example, the compressed feature information of the original image by transforming the feature with a predetermined transform equation in some cases, and calculating it with a predetermined arithmetic equation in some cases, according to a predetermined reversible encoding technique (for example, JBIG encoding, being an internal standard of arithmetic encoding and binary image encoding, and the like). Specifically, the extracted pixel information encoding device 214 encodes the data comprised of the bit sequences (the number of the extracted pixels×M bits) in which respective bit sequences generated as extracted pixel information have been linked in a predetermined ranking order decided, on the basis of locations of the pixels that has become an extraction target, with an arithmetic encoding technique in some cases, and encodes it with a JBIG encoding technique by regarding it as image data of the binary image in some cases. Additionally, the extracted pixel information encoding device 214 may regard the value itself of each of pieces of the extracted pixel information as a code to transmit it without compressing the data because the data amount as a one-frame portion of the features have already been decimated with the operations of the decimating of the pixels and the bit extraction.

When a one-frame portion of the extracted pixel information (M bits) is encoded as a feature of the original image, the image sending apparatus 21 (specifically, the communication control apparatus) transmits the encoding feature information obtained with the encoding to the end user terminal 23 via the transmission path 22 (step A107). Additionally, the process of transmitting the feature is caused to synchronize with the process of transmitting the encoded image. Additionally, the feature does not need to be always transmitted together with the image information, and the feature is transmitted before or after transmitting the image information in such a manner that it can be seen which frame of which encoded image is associated with transmitted feature. For example, an all-frame portion of features may be transmitted collectively, and a constant-time frame portion of the features (for example, 30 frames as a one-second portion of the frames) may be transmitted collectively for every constant time (one second).

When the image sending apparatus 21 completes the above-mentioned process for one image frame, it determines whether the process for the frame as far as the end frame of the original image has been completed (step A108), returns to the step A101 when it has not been completed, and repeats a series of the processes for the next image frame. When the process for the frame as far as the end frame has been completed, the image sending apparatus 21 finishes the process.

Next, an operation of the end user terminal 23 will be explained. The end user terminal 23 receives the image information of the encoded image and the encoded feature information (a one-frame portion of the extracted pixel information (M bits)) of the original image from the image sending apparatus 21. As shown in FIG. 6, the image decoding device 231 of the end user terminal 23, upon receipt of the image information of the encoded image (step B101), decodes the encoded image (step B102). Specifically, the image decoding device 231 restores the image information of the encoded image to the image information, which is obtained before the encoding, by transforming it with a predetermined transform equation in some cases, and calculating it with a predetermined arithmetic equation, according to the decoding technique (for example, the decoding technique corresponding to MPEG-2, the decoding technique corresponding to H.264 (MPEG-4 AVC) corresponding to the encoding technique employed for the encoding. That is, the image decoding device 231 generates the image information for expressing an image identical to the original image expressed before the encoding. Additionally, the information compressed with the encoding is not completely restored with many encoding techniques, and the encoded image is decoded to the deteriorated image of which the image quality has deteriorated. The received image that is obtained with this decoding is outputted to a display device connected to the end user terminal 23 (step B103).

The end user terminal 23 performs the decoding process as well for the encoded feature information of the original image in parallel to the process of decoding this encoded image. The extracted pixel information decoding device 232 of the end user terminal 23, upon receipt of the encoded feature information of the original image (step B104), decodes it, and obtains a one-frame portion of the extracted pixel information (M bits) of the original image (step B105). The extracted pixel information decoding device 232 generates information indicative of a feature identical to the feature shown before the encoding, for example, by transforming the encoded feature of the original image with a predetermined transform equation in some cases, and calculating it with a predetermined arithmetic equation in some cases, according to a decoding technique corresponding to the encoding technique performed by the extracted pixel information encoding device 214 of the image sending apparatus 21. Additionally, when the extracted pixel information encoding device 214 encodes the feature by employing the reversible encoding technique (for example, JBIG encoding technique), the extracted pixel information decoding device 232 can obtain information completely coinciding with the content that is obtained before the encoding by performing the arithmetic operation such as an adaptive arithmetic decoding.

Next, the original image pixel information estimation device 233 estimates the pixel information in an N-bit sequence, being an original bit number expression, for each of pieces of the extracted pixel information (M bits) of the original image obtained with the decoding (step B106). The original image pixel information estimation device 233 estimates the pixel information (N bits) of the original image, for example, by complimenting the low order bits, out of the bits (the bits excluded at the extracting the bits from the pixel information) that are not transmitted as the extracted pixel information (M bits) of the original image, with zero, and complementing the high order bits with the value of the pixel information of the identical pixel position in the received image.

When the pixel information of the original image is estimated with regard to all of pieces of the transmitted extracted pixel information, the image quality estimation device 234 estimates the image quality of the received image as against the original image from the estimated pixel information of the original image and the image information of the received image (step B107). The image quality estimation device 234 may obtain, for example, a difference between the value of the above pixel information and the value of the corresponding pixel information (the pixel information of the identical pixel position) of the received image with respect to all of pieces of the estimated pixel information of the original image to regard an average value of the square values of these values as an error of the entirety of the image, and to estimate the image quality. And, the image quality estimation device 234 outputs the obtained error of the entirety of the image as an image quality evaluation value indicative of a degree of the deterioration of the image quality to the display device etc. (step B108).

Additionally, when the above-mentioned process is completed for one image frame, the end user terminal 23 determines whether or not the received data still exists (step B109), returns to the step B101 and the step B104, and repeats a series of the processes for the next image frame when it exists. The end user terminal 23 finishes the process when it does not exist.

As mentioned above, in accordance with this embodiment, extracting the data expressive of the image frame of the comparison image such as the original image in the bit sequence of which the bit number is few, and employing it for evaluating the image quality makes it possible to evaluate the image quality of the transmitted image at a high precision also under a constant limit to the transmission path band because only information of which a degree of the influences upon a result of estimating the deterioration of the image quality is small can be reduced without the number of pieces of data reduced that are extracted per one frame.

Figure 7:
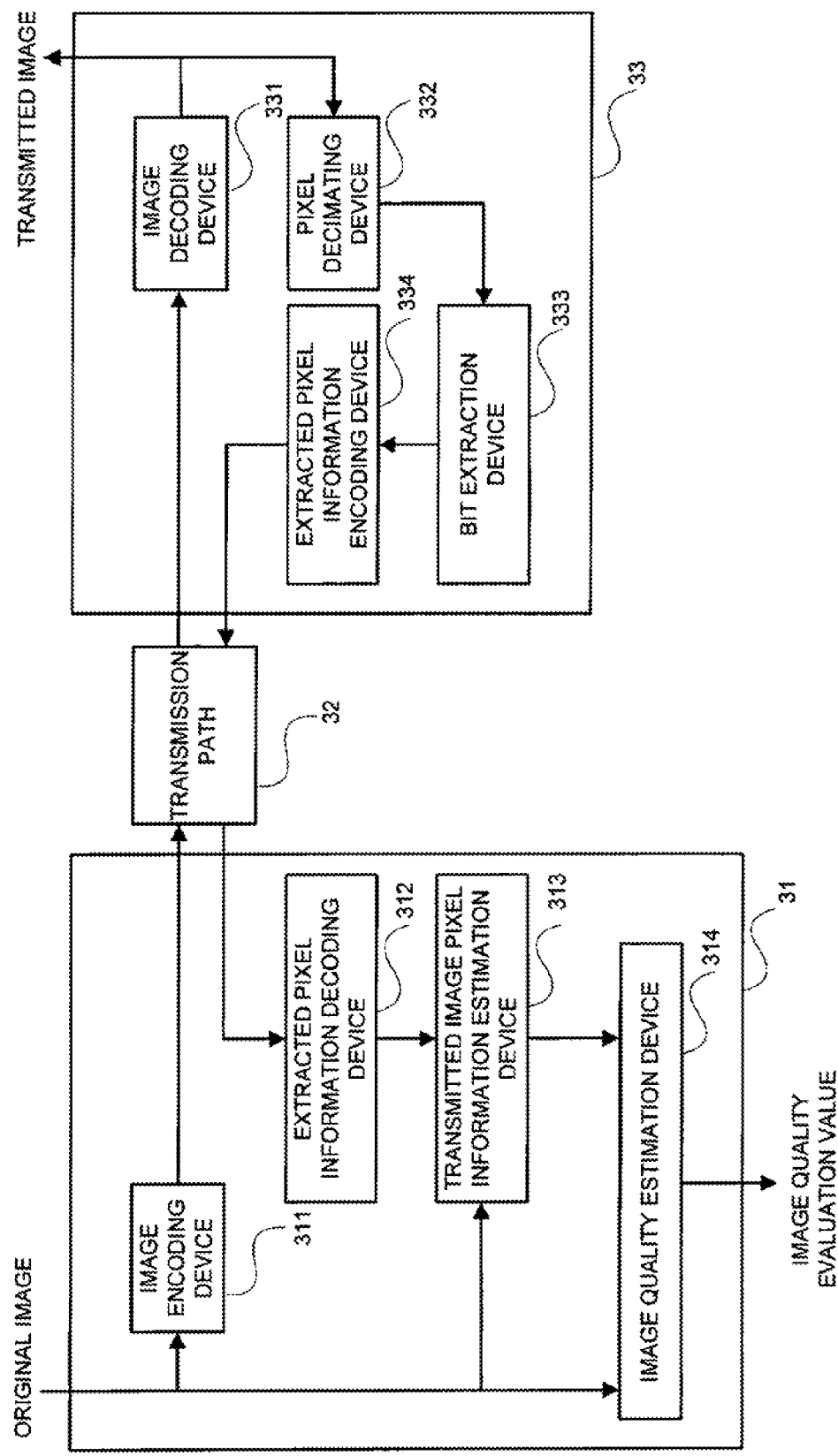
FIG. 7 is a block diagram illustrating another exemplary configuration of the image quality evaluation system.

Additionally, while the image quality evaluation system in which the end user terminal 23 obtained a difference with the transmitted image on a basis of the feature of the original image transmitted from the image sending apparatus 21, and evaluated the image quality of the transmitted image was explained in the above-mentioned embodiment, for example by making a configuration as shown in FIG. 7, the image quality of the transmitted image can be also evaluated in the image sending apparatus side.

FIG. 7 is a block diagram illustrating another exemplary configuration of the image quality evaluation system. In the image quality evaluation system shown in FIG. 7, an image sending apparatus 31 includes an extracted pixel information decoding device 312, a transmitted image pixel information estimation device 313, and an image quality estimation device 314, and a end user terminal 33 includes a pixel decimating device 332, a bit extraction device 333, and an extracted pixel information encoding device 334. Additionally, operations of individual devices are basically similar to the operations explained above except that the image defined as a target of the processing is replaced.

Specifically, the pixel decimating device 332, the bit extraction device 333, and the extracted pixel information encoding device 334 of the end user terminal 33 perform operations similar to the operations of the pixel decimating device 212, the bit extraction device 213, and the extracted pixel information encoding device 214 shown in FIG. 4 for the image frame of the received image, respectively. That is, the pixel decimating device 332 decimates the pixels for the image frame of the received image. The bit extraction device 333 extracts pre-designated bits for the pixel information (N bits) of each pixel of the received image left over after the decimating performed by the pixel decimating device 332. The extracted pixel information encoding device 334 collects a one-frame portion of the extracted pixel information (M bits) of the original image that is comprised of the bit sequences extracted by the bit extraction device 333, and encodes it as a feature of the received image. Additionally, the encoded feature of the received image is transmitted via the communication control apparatus to the image sending apparatus 31.

On the other hand, the extracted pixel information decoding device 312, the transmitted image pixel information estimation device 313, and the image quality estimation device 314 of the image sending apparatus 31 perform operations similar to the operations of the extracted pixel information decoding device 232, the original image pixel information estimation device 233, and the image quality estimation device 234 shown in FIG. 4 for the image frame of the original image, respectively. That is, the extracted pixel information decoding device 312 decodes the encoded feature information (that is, a one-frame portion of the encoded extracted pixel information (M bits) of the transmitted image (the image received by the end user terminal 33) received via the communication control apparatus (not shown in the figure) from the end user terminal 33. The transmitted image pixel information estimation device 313 estimates the value of the pixel information, being an original bit number expression, from each of pieces of the extracted pixel information (M bits) of the transmitted image obtained with the decoding performed by the extracted pixel information decoding device 312. The image quality estimation device 314 estimates the image quality of the transmitted image as against the original image from the pixel information (N bits) of the transmitted image estimated by the transmitted image pixel information estimation device 313 based upon each of pieces of the extracted pixel information (M bits) of the transmitted image, and the image information of the original image.

Embodiment 2

Next, the second embodiment of the present invention will be explained. This embodiment takes the carry from the low order bits into consideration at the moment of complementing the not-extracted high order bits. Additionally, a configuration of this embodiment is similar to that of the first embodiment. Hereinafter, the explanation is made with the case of applying this embodiment for the image evaluation apparatus system shown in FIG. 4 exemplified.

For example, it is assumed that the extracted pixel information in which low order six bits except for high order two bits has been extracted for the pixel information being expressed with eight bits per one pixel is transmitted. It follows that when the value of the original pixel information is 0×3F ("0011 1111" in a binary number), low order six bits "11 1111", out of the bits, are transmitted. On the other hand, it is assumed that, in the received image, the value of the pixel information of the pixel corresponding to this extracted pixel information is 0×40 ("0100 0000" in a binary number). In this case, while a difference is 1 in the original extracted pixel information (eight bits), the value of the pixel information (eight bits) of the estimated original image becomes 0×4F ("0111 1111" in a binary number) when the original image pixel information estimation device 233 of the end user terminal 23 complements the not-extracted high order two bits with the value of the corresponding pixel information of the received image, so the above value largely differs from the actual difference.

Thereupon, this embodiment regards a combination of the values allowing a difference with the corresponding pixel information of the received image to become minimized, out of combinations of the values that not-extracted high order bits can assume, as a value of the above high order bits. In the above-mentioned example, a combination "00" having a minimum difference between the pixel information determined to be an estimation result and the corresponding pixel information of the received image is selected from among combinations of the values "00", "01", "10", and "11" that the high order two bits can assume. As a result, the value 0×3F, which is expressed with a bit sequence "0011 1111" having the above value added therein as high order two bits is estimated as pixel information of the original image. Additionally, when the low order bits are included in the not-extracted bits, a combination of the values allowing a difference with the corresponding pixel information to become minimized is selected on top of complementing the low order bits according to a predetermined method.

As mentioned above, this embodiment makes it possible to maintain a high-precision estimation of the image quality even in such a case that the carry to the removed high order bits occurs.

Embodiment 3

Next, the third embodiment of the present invention will be explained. This embodiment takes the error occurring due to the not-extracted low order bits into consideration. Additionally, a configuration of this embodiment is similar to that of the first embodiment. Hereinafter, the explanation is made with the case of applying this embodiment for the image evaluation apparatus system shown in FIG. 4 exemplified.

For example, it is assumed that information of the extracted pixel in which high order six bits except for low order two bits have been extracted for the pixel information being expressed with eight bits per one pixel is transmitted. Herein, when the original image pixel information estimation device 233 of the end user terminal 23 complements the not-extracted low order two bits with "00", the error with the pixel information (eight bits) of the actual original image is zero when the low order two bits of the pixel information (eight bits) of the original image is "00". However, the error is 1 when it is "01", the error is 2 when it is "10", and the error is 3 when it is "11".

When it is assumed that an occurrence probability of the low order two bits of the pixel information (eight bits) of the original image is not biased, an average value of the errors becomes (0+1+2+3)÷4=1.5. The image quality estimation device 234 evaluates the image quality on the basis of the value obtained by subtracting this average value of the errors from a difference calculated by employing the estimation result.

As mentioned above, in accordance with this embodiment, averaging the errors that occur at the moment of estimating the pixel information makes it possible to perform a high-precision evaluation of the image quality more stably.

Embodiment 4

Next, the fourth embodiment of the present invention will be explained. This embodiment amends the not-extracted low order bits. Additionally, a configuration of this embodiment is similar to that of the first embodiment. Hereinafter, the explanation is made with the case of applying this embodiment for the image evaluation apparatus system shown in FIG. 4 exemplified.

For example, it is assumed that the extracted pixel information in which high order six bits except for low order two bits have been extracted for the pixel information being expressed with eight bits per one pixel is transmitted. Herein, when the original image pixel information estimation device 233 of the end user terminal 23 complements the not-extracted low order two bits with "00", it follows that the error of at most 3 occurs with the pixel information (eight bits) of the actual original image.

This embodiment complements the low order bits, which are not extracted, with an average value of the values expressible with the bit sequence thereof so as to suppress this error. In the above-mentioned example, an average value of the values expressible with the low order two bits is (0+1+2+3)÷4=1.5, whereby the low order bits are complemented with "01" (in binary number), being the integerized number of this average value 1.5. Additionally, it may be complemented with "10" (in binary number).

With this, the error with the pixel information (eight bits) of the actual original image is 1 when the low order two bits of the pixel information (eight bits) of the original image is "00", is 0 when it is "01", is 1 when it is "10", and is 2 when it is "11". When it is assumed that an occurrence probability of the low order two bits of the pixel information (eight bits) of the original image is not biased, an average value of the errors becomes (1+0+1+2)÷4=1, and the error due to the fact that the low order bits are not transmitted can be suppressed. As a result, a high-precision estimation of the image quality can be maintained.

Additionally, each of the foregoing second, third, and fourth embodiments operates independently, so they can be combined arbitrarily for operation.

Embodiment 5

Figure 8:
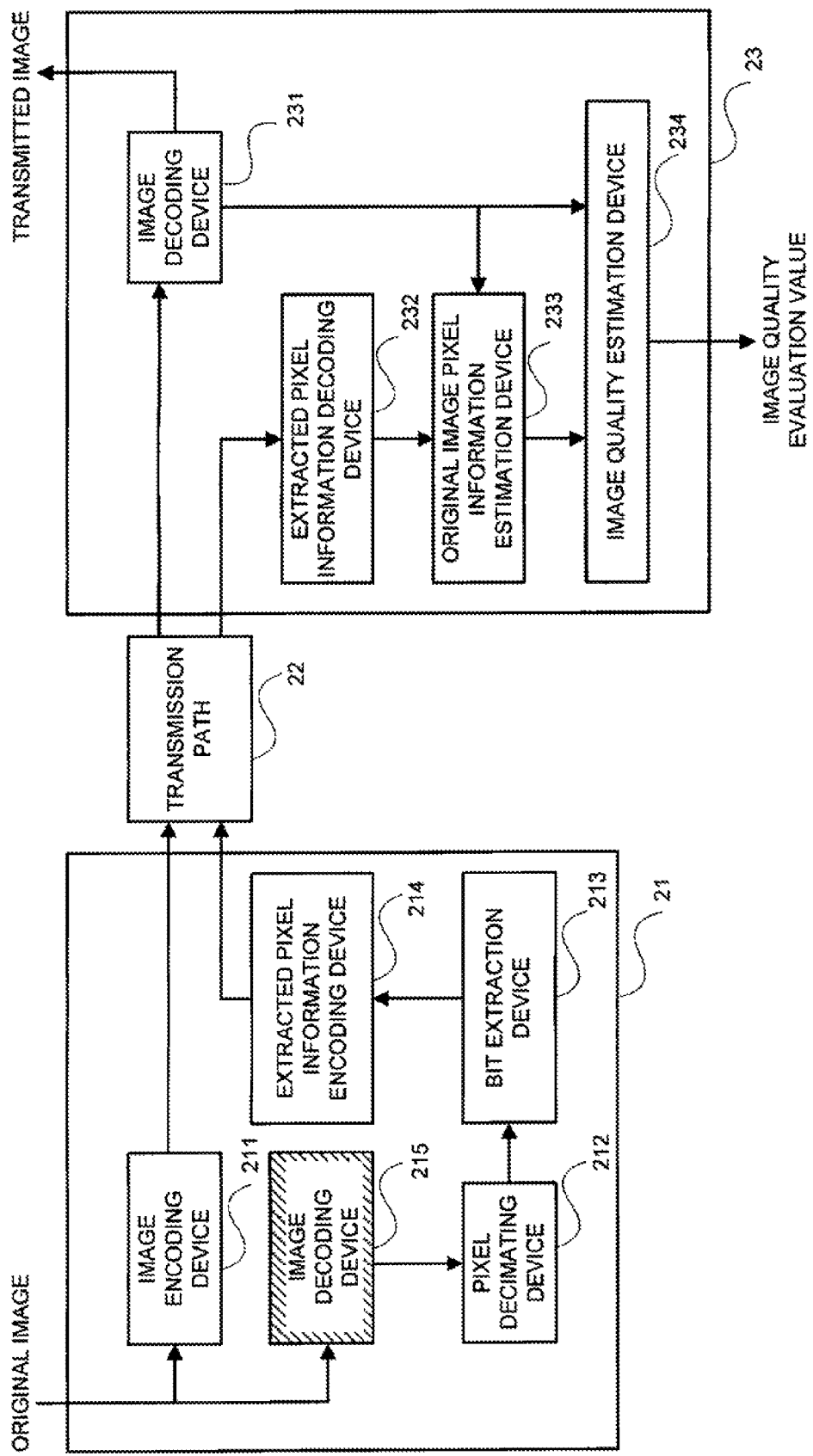
FIG. 8 is a block diagram illustrating an exemplary configuration of the image quality evaluation system in accordance with a fifth embodiment.

Next, the fifth embodiment of the present invention will be explained. FIG. 8 is a block diagram illustrating an exemplary configuration of the image quality evaluation system in accordance with the fifth embodiment. As shown in FIG. 8, the image quality evaluation system in accordance with the fifth embodiment differs from the first embodiment shown in FIG. 4 in a point that the image sending apparatus 21 includes an image decoding device 215.

The image decoding device 215 decodes the encoded image that is obtained with the encoding of the original image by the image encoding device 21 so as to obtain the image information of the transmitted image that is obtained before the transmission. In this embodiment, each of the pixel decimating device 212, the bit extraction device 213, and the extracted pixel information encoding device 214 performs a predetermined process for the image frame of the decoded image that is obtained with the decoding by the image decoding device 215.

That is, the pixel decimating device 212 decimates the pixels for the image frame of the decoded image that is obtained with the decoding by the image decoding device 215. The bit extraction device 213 extracts pre-designated bits for the pixel information (N bits) of each pixel of the decoded image left over after the decimating. The extracted pixel information encoding device 214 collects a one-frame portion of the extracted pixel information (M bits) of the decoded image that is comprised of the bit sequences extracted by the bit extraction device 213, and encodes it as a feature of the decoded image. Additionally, the feature of the decoded image that has been encoded is transmitted via the communication control apparatus to the end user terminal 23.

Making such a configuration makes it possible to have the end user terminal 23 estimate only the deterioration of the image quality caused by the transmission error in the transmission path 22.

Embodiment 6

Figure 9:
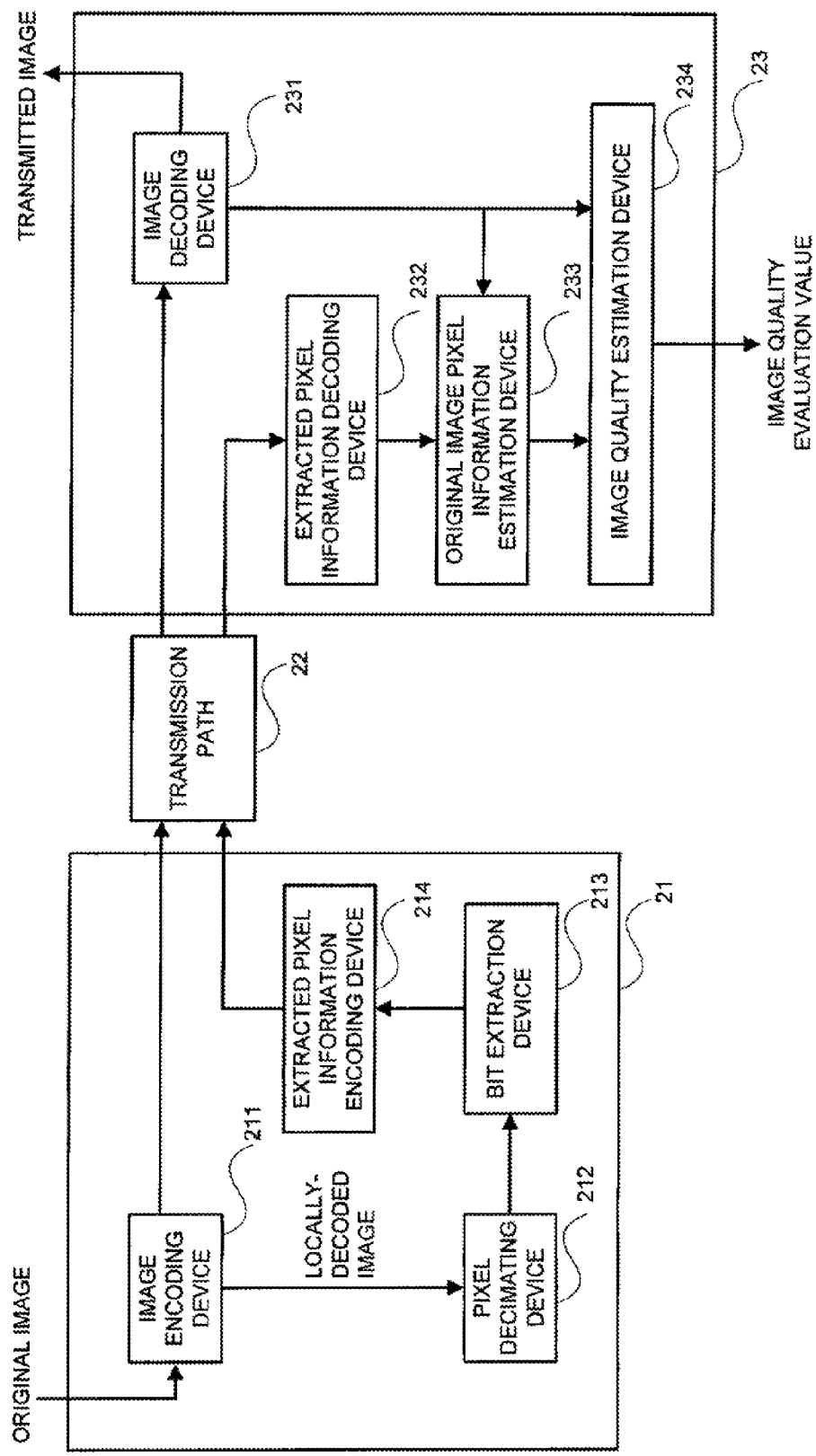
FIG. 9 is a block diagram illustrating an exemplary configuration of the image quality evaluation system in accordance with a sixth embodiment.

Next, the sixth embodiment of the present invention will be explained. FIG. 9 is a block diagram illustrating an exemplary configuration of the image quality evaluation system in accordance with the sixth embodiment. As shown in FIG. 9, the image quality evaluation system in accordance with this embodiment differs from the first embodiment shown in FIG. 4 in a point that the image to be inputted into the pixel decimating device 212 is a locally-decoded image to be outputted from the image encoding device 211.

In this embodiment, the image encoding device 211 performs the decoding process for some frames for a purpose of inter-frame prediction encoding when encoding the original image. Each of the pixel decimating device 212, the bit extraction device 213, and the extracted pixel information encoding device 214 performs a predetermined process with the image frame of the locally-decoded image targeted that is generated in the course of the encoding process by the image encoding device 211.

That is, the pixel decimating device 212 decimates the pixels for the image frame of the locally-decoded image, which is obtained with the decoding process that is performed by the image encoding device 211 for a purpose of the encoding. The bit extraction device 213 extracts pre-designated bits for the pixel information (N bits) of each pixel of the locally-decoded image left over after the decimating. The extracted pixel information encoding device 214 collects a one-frame portion of the extracted pixel information (M bits) of the locally-decoded image that is comprised of the bit sequences extracted by the bit extraction device 213, and encodes it as a feature of the locally-decoded image. Additionally, the feature of the locally-decoded image that has been encoded is transmitted via the communication control apparatus to the end user terminal 23.

Utilizing the locally-decoded image, which is generated in the course of the encoding process, in such a manner also makes it possible to have the end user terminal 23 estimate only the deterioration of the image quality caused by the transmission error in the transmission path 22.

Embodiment 7

Figure 10:
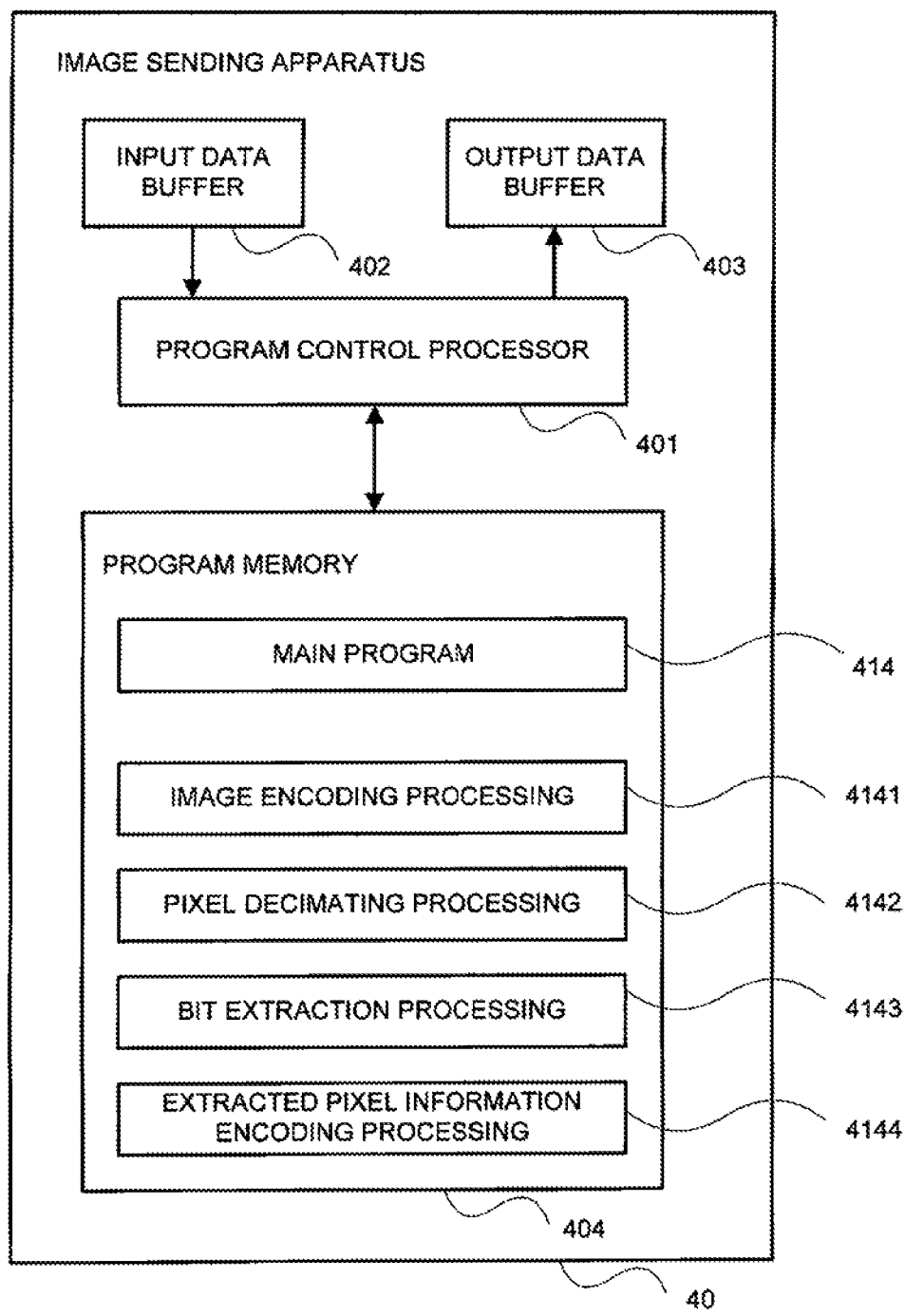
FIG. 10 is a block diagram illustrating an exemplary configuration of the image sending system in accordance with a seventh embodiment.
Figure 11:
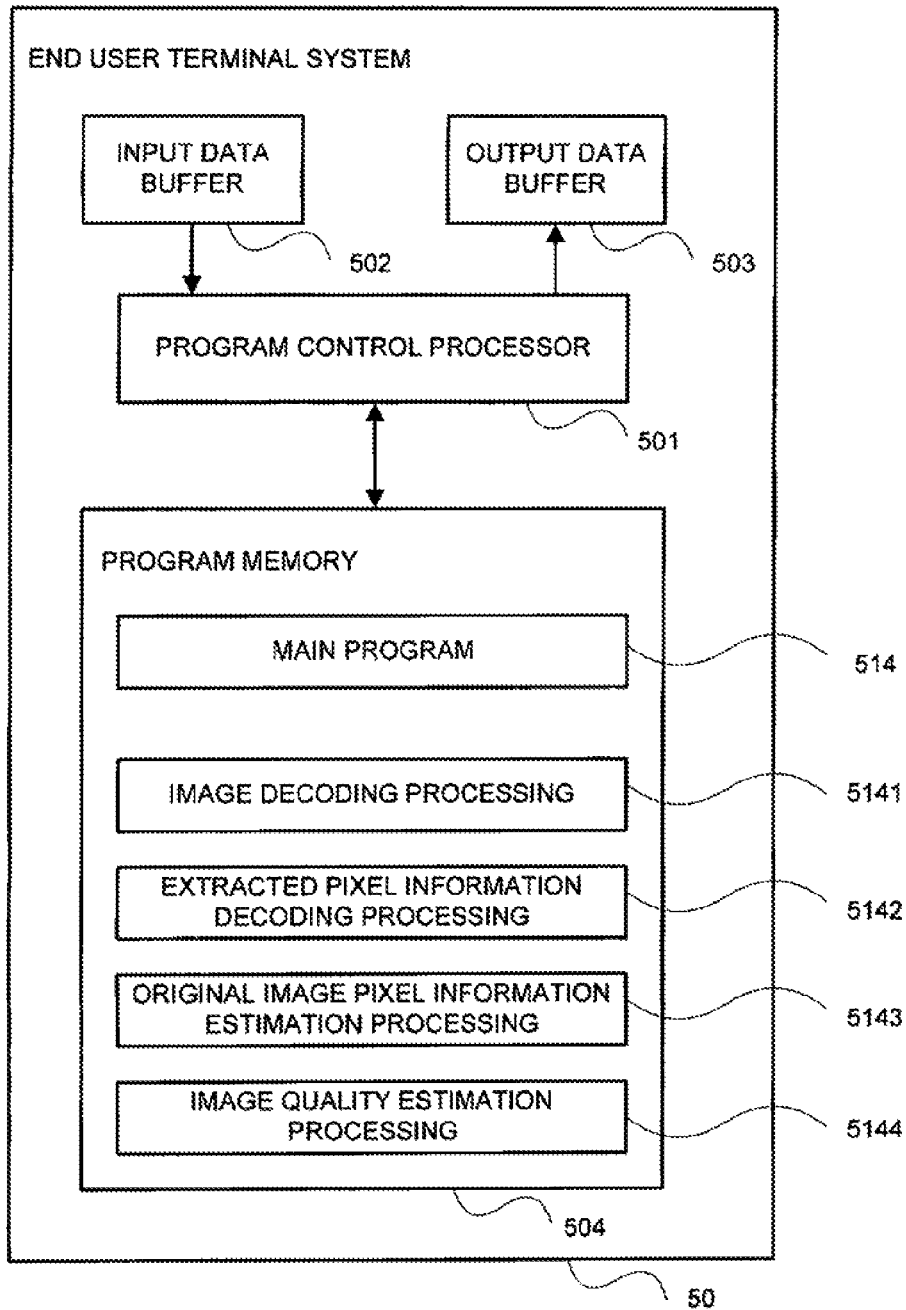
FIG. 11 is a block diagram illustrating an exemplary configuration of the end user terminal system in the seventh embodiment.

Next, the sixth embodiment of the present invention will be explained. In this embodiment, the operation of each apparatus in the foregoing first embodiment is executed with the computer system. FIG. 10 is a block diagram illustrating an exemplary configuration of the image sending system in this embodiment. Further, FIG. 11 is a block diagram illustrating an exemplary configuration of the end user terminal system in this embodiment. Additionally, an image sending system 40 is equivalent to the image sending apparatus 21 in the first embodiment shown in FIG. 4. Further, an end user system 50 is equivalent to the end user terminal 23 in the first embodiment shown in FIG. 4.

The image sending system shown in FIG. 10 is provided with a program control processor 401. And, a program memory 404 having a program stored therein for causing the program control processor 401 to execute a process of realizing an operation similar to the operation of the image sending apparatus 21 in the first embodiment, in addition to an input data buffer 402 and an output data buffer 403, is connected to the program control processor 401.

The input data buffer 402 is a buffer for storing various kinds of data that is inputted into the program control processor 401. The output data buffer 403 is a buffer for storing various kinds of data that is outputted by the program control processor 401, and further, for inputting them into the program control processor 401 responding to a necessity.

Program modules to be stored into the program memory 404 includes an image encoding processing module 4141, a pixel decimating processing module 4142, a bit extraction processing module 4143, and an extracted pixel information encoding processing module 4144 in addition to a main program 414. The main program 414 is a main program for collectively executing the above-mentioned processing modules 4141 to 4144. Further, the image encoding processing module 4141, the pixel decimating processing module 4142, the bit extraction processing module 4143, and the extracted pixel information encoding processing module 4144 are modules for functionally realizing the image encoding device 211, the pixel decimating device 212, the bit extraction device 213, and the extracted pixel information encoding device 214 of the first embodiment, respectively. Additionally, the program control processor 401 calls up each of the processing modules 4141 to 4144 according to the main program, thereby to have each of them execute a process similar to the process of the image sending apparatus 21 in the first embodiment.

Further, the end user terminal system 50 shown in FIG. 11 is provided with a program control processor 501. And, a program memory 504 having a program stored therein for executing a process necessary for evaluating the image quality in accordance with the first embodiment in the side in which the image is received, in addition to an input data buffer 502 and an output data buffer 503, is connected to the program control processor 501.

The input data buffer 502 is a buffer for storing various kinds of data that is inputted into the program control processor 501. The output data buffer 503 is a buffer for storing various kinds of data that is outputted by the program control processor 501, and further, for inputting them into the program control processor 501 responding to a necessity.

Program modules to be stored into the program memory 504 includes an image decoding processing module 5141, an extracted pixel information decoding processing module 5142, an original image pixel information estimation processing module 5143, and an image quality estimation processing module 5144 in addition to a main program 514. The main program 514 is a main program for collectively executing the above-mentioned processing modules 5141 to 5144. Further, the image decoding processing module 5141, the extracted pixel information decoding processing module 5142, the original image pixel information estimation processing module 5143, and the image quality estimation processing module 5144 are modules for functionally realizing the image decoding device 231, the extracted pixel information decoding device 232, the original image pixel information estimation device 233, and the image quality estimation device 234 of the first embodiment, respectively. Additionally, the program control processor 501 calls up each of the processing modules 5141 to 5144 according to the main program 514, thereby to have each of them execute a process similar to the process of the end user terminal 23 in the first embodiment.

In this embodiment, the program control processors 401 and 501 of the image sending system 40 and the end user terminal system 50 execute various processing modules according to the main programs 414 and 514, respectively, thereby allowing an operation of evaluating the image quality similar to the operation of the first embodiment to be realized.

Additionally, the program memories 404 and 504 store programs corresponding to the image sending apparatus 21 and the end user terminal 23 in accordance with the second, third, fourth, fifth and sixth embodiments, respectively, thereby enabling an operation of evaluating the image quality similar to the operation of each embodiment to be executed. That is, a system similar to the system of each embodiment can be realized over the computer system.

Exemplary Embodiment 1

Next, an operation of the image quality evaluation system in accordance with the present invention will be explained by employing a specific exemplary embodiment. This exemplary embodiment, which is an exemplary embodiment in the embodiment in which the second embodiment and the fourth embodiment have been combined, estimates the image quality of the transmitted image having the moving picture of an SDTV size (horizontal 720 pixels, vertical 480 pixels, and 29.97 frames per second) as an original image by employing a 1350-pixel portion of the brightness information (eight bits) per one image frame.

At first, when image data of the moving picture of an SDTV size (horizontal 720 pixels, vertical 480 pixels, and 29.97 frames per second) is inputted into the image sending apparatus 21, the image encoding device 211 encodes the above moving picture with the MPEG-2 encoding technique.

Next, the pixel decimating device 212 decimates the pixels for one image frame of the inputted moving picture for every horizontal 16 pixels and for every vertical 16 pixels.

Next, the bit extraction device 213 extracts the central four bits except for the high order two bits and the low order two bits for the brightness information of 1350 pixels left over after the decimating, and generates extracted brightness information that is comprised of the four-bit sequences.

Next, the extracted pixel information encoding device 214 collectively encodes this 1350-pixel portion of the extracted brightness information as a feature of the original image. Herein, it is assumed that the information is encoded with the reversible compression in accordance with the JBIG technique.

And, the image (encoded image) encoded by the image encoding device 211, and the feature of the original image encoded by the extracted pixel information encoding device 214 are transmitted via the transmission path 22 to the end user terminal 23.

The end user terminal 23 receives the encoded image and the encoded feature of the original image from the image sending apparatus 21. The image decoding device 231 of the end user terminal 23 decodes the received information of the encoded image with the decoding technique corresponding to the MPEG-2 technique, and restores it to the image frame of the received image. This image frame of the received image is sent to the original image pixel information estimation device 233 and the image quality estimation device 234.

On the other hand, the extracted pixel information decoding device 232 decodes the encoded feature of the original image, which has been received, with the decoding technique corresponding to the JBIG technique, and restores it to a one-frame portion of the extracted brightness information (four bits) of the original image.

Next, the original image pixel information estimation device 233 complements the not-transmitted low order two bits with "00", being an average value of the values expressible with the above low order two bits, for each of pieces of the extracted brightness information (four bits) that has been restored. Further, the original image pixel information estimation device 233 complements the not-transmitted high order two bits with the value of the combination allowing a difference with the brightness information (eight bits) of the received image at a pixel position identical to the position of the pixel of which the above extracted brightness information has been extracted to become minimized, out of combinations of the values that the above high order two bits can assume. The value being expressed with eight-bit data that is obtained by complementing the high order bits and the low order bits in such a manner is estimated as brightness information (eight bits) of the original image.

The original image pixel information estimation device 233 performs such an estimation process by a 1350-pixel portion per one frame, and a 1350-pixel portion of a brightness information group of the original image is sent to the image quality estimation device 234 as a result thereof.

The image quality estimation device 234 calculates a square value of a difference between the above brightness information and the corresponding brightness information in the received image for a 1350-pixel portion of the brightness information (estimated brightness information) of the original image. The image quality estimation device 234 adds a 1350-pixel portion of the values (square value of a difference), and divides an addition result by 1350, thereby to calculate the estimation value of the mean square error of this frame.

Additionally, the present invention is applicable to the system as well for evaluating the image quality by employing predetermined frequency information to be extracted from the image frame of the original image. For example, when the original image having the brightness value being expressed with eight bits per a pixel is divided into blocks each of which is configured of horizontal eight pixels×vertical eight pixels, each block is subjected to a discrete cosine transform, and the image quality is evaluated on a basis of the value obtained by extracting a predetermined coefficient (for example, a fourth-place coefficient in the horizontal direction, a fourth-place coefficient in the vertical direction, and so on) from 8×8 transform coefficients, being a transform result, the value obtained by extracting the central continuous bits (for example, with the case of being expressed with 16 bits, the central eight bits except for the high order four bits and the low order four bits) from each coefficient being extracted is transmitted as a feature of the original image. A transmittee side estimates the coefficient in the original bit number expression from each of pieces of the extracted frequency information (the coefficient being expressed with the central eight-bit sequence) being transmitted as a feature of the original image on a basis of the coefficient extracted by performing the similar frequency information extraction process for the received image, and estimates the image quality according magnitude of a difference between the estimated value of the coefficient and the value of the coefficient extracted from the received image with the identical method.

The 1st mode of the present invention is characterized in that an image quality evaluation system for evaluating an image quality of an image, comprising: a bit extraction means for, for predetermined data expressive of an image frame of a first image, extracting predetermined bits of which a bit number is fewer than the bit number necessary for expressing the above data per one piece of data; and an image quality evaluation means for, based upon the value being expressed with bit sequences extracted by said bit extraction means, and the value of data equivalent to the data that has become a target of extracting the above bit sequences in a second image, estimating a difference between said first image and said second image, thereby to evaluate the image quality of said first image or second image.

The 2nd mode of the present invention is characterized in that, in the above-mentioned mode, for the predetermined data expressive of the image frame of the first image, said bit extraction means extracts continuous predetermined bits of which a bit number is fewer than the bit number necessary for expressing the above data per one piece of data.

The 3rd mode of the present invention is characterized in that, in the above-mentioned modes, for the predetermined data expressive of the image frame of the first image, said bit extraction means extracts continuous predetermined bits of which a bit number is fewer than the bit number necessary for expressing the above data per one piece of data except for predetermined high order bits of the above data.

The 4th mode of the present invention is characterized in that, in the above-mentioned modes, for the predetermined data expressive of the image frame of the first image, said bit extraction means extracts continuous predetermined bits of which a bit number is fewer than the bit number necessary for expressing the above data per one piece of data except for predetermined high order bits and predetermined low order bits of the above data.

The 5th mode of the present invention is characterized in that, in the above-mentioned modes, the predetermined data expressive of the image frame is an average value of pixel information by each of blocks having a predetermined size into which the image frame has been divided.

The 6th mode of the present invention is characterized in that, in the above-mentioned modes, the predetermined data expressive of the image frame is an average value of an average value of pixel information and an absolute value of a difference between each pixel information and said average value, by each of blocks having a predetermined size into which the image frame has been divided.

The 7th mode of the present invention is characterized in that, in the above-mentioned modes, the predetermined data expressive of the image frame is a dispersion of pixel information by each of blocks having a predetermined size into which the image frame has been divided.

The 8th mode of the present invention is characterized in that an image quality evaluation system for evaluating the image quality of a transmitted image that is obtained by decoding an encoded image in which an original image has been encoded in a transmission destination thereof the above-mentioned modes, comprising an image sending apparatus for encoding the original image and transmitting said encoded image, and an image reception apparatus for obtaining the transmitted image by receiving said encoded image from said image sending apparatus and decoding it: wherein the image sending apparatus comprises: a bit extraction means for, for the predetermined data expressive of the image frame of the original image, extracting predetermined bits of which a bit number is fewer than the bit number necessary for expressing the above data per one piece of data; and a feature transmission means for transmitting the value being expressed with the bit sequences extracted by said bit extraction means as a feature of said original image to the image reception apparatus, being a transmission destination of said encoded image; and wherein the image reception apparatus comprises an image quality evaluation means for estimating a difference between the original image and the transmitted image based upon the value that is expressed with the bit sequences extracted by said bit sequence extraction means, said value being received as a feature of said original image, and the value of data equivalent to the data that has become a target of extracting the above bit sequences in the image frame of the transmitted image, thereby to evaluate the image quality of the transmitted image.

The 9th mode of the present invention is characterized in that an image quality evaluation system for evaluating the image quality of a transmitted image that is obtained by decoding an encoded image in which an original image has been encoded in a transmission destination thereof the above-mentioned modes, comprising an image sending apparatus for encoding the original image and transmitting said encoded image, and an image reception apparatus for obtaining the transmitted image by receiving said encoded image from said image sending apparatus and decoding it: wherein the image reception apparatus comprises: a bit extraction means for, for the predetermined data expressive of the image frame of the transmitted image, extracting predetermined bits of which a bit number is fewer than the bit number necessary for expressing the above data per one piece of data; and a feature transmission means for transmitting the value being expressed with the bit sequences extracted by said bit extraction means as a feature of said transmitted image to the image sending apparatus, being a transmission source of said encoded image; and wherein the image sending apparatus comprises an image quality evaluation means for estimating a difference between the original image and the transmitted image based upon the value that is expressed with the bit sequences extracted by said bit sequence extraction means, said value received as a feature of said transmitted image, and the value of data equivalent to the data that has become a target of extracting the above bit sequences in the image frame of the original image, thereby to evaluate the image quality of the transmitted image.

The 10th mode of the present invention is characterized in that an image quality evaluation system for evaluating the image quality of a transmitted image that is obtained by decoding an encoded image in which an original image has been encoded in a transmission destination thereof the above-mentioned modes, comprising an image sending apparatus for encoding the original image and transmitting said encoded image, and an image reception apparatus for obtaining the transmitted image by receiving said encoded image from said image sending apparatus and decoding it: wherein the image sending apparatus comprises: a bit extraction means for, for the predetermined data expressive of the image frame of the decoded image that is obtained by decoding the encoded image without transmitting it, extracting predetermined bits of which a bit number is fewer than the bit number necessary for expressing the above data per one piece of data; and a feature transmission means for transmitting the value being expressed with the bit sequences extracted by said bit extraction means as a feature of said decoded image to the image reception apparatus, being a transmission destination of said encoded image; and wherein the image reception apparatus comprises an image quality evaluation means for estimating a difference between the decoded image and the transmitted image based upon the value that is expressed with the bit sequences extracted by said bit sequence extraction means, said value received as a feature of said decoded image, and the value of data equivalent to the data that has become a target of extracting the above bit sequences in the image frame of the transmitted image, thereby to evaluate the image quality of the transmitted image.

The 11th mode of the present invention is characterized in that an image quality evaluation system for evaluating the image quality of a transmitted image that is obtained by decoding an encoded image in which an original image has been encoded in a transmission destination thereof the above-mentioned modes, comprising an image sending apparatus for encoding the original image and transmitting said encoded image, and an image reception apparatus for obtaining the transmitted image by receiving said encoded image from said image sending apparatus and decoding it: wherein the image sending apparatus comprises: a bit extraction means for, for the predetermined data expressive of the image frame of a locally-decoded image that is obtained in a course of encoding the original image, extracting predetermined bits of which a bit number is fewer than the bit number necessary for expressing the above data per one piece of data; and a feature transmission means for transmitting the value being expressed with the bit sequences extracted by said bit extraction means as a feature of said locally decoded image to the image reception apparatus, being a transmission destination of said encoded image; and wherein the image reception apparatus comprises an image quality evaluation means for estimating a difference between the locally-decoded image and the transmitted image based upon the value that is expressed with the bit sequences extracted by said bit sequence extraction means, said value received as a feature of said locally-decoded image, and the value of data equivalent to the data that has become a target of extracting the above bit sequences in the image frame of the transmitted image, thereby to evaluate the image quality of the transmitted image.

The 12th mode of the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising: a bit extraction means for, for predetermined data expressive of an image frame of an original image, extracting predetermined bits of which a bit number is fewer than the bit number necessary for expressing the above data per one piece of data; and a feature transmission means for transmitting the value being expressed with bit sequences extracted by said bit extraction means as a feature of said original image to an image reception apparatus, being a transmission destination of said encoded image.

The 13th mode of the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising an image quality evaluation means for estimating a difference between the original image and the transmitted image based upon the value being expressed with bit sequences that are obtained by extracting predetermined bits for predetermined data expressive of an image frame of said transmitted image, said value received as a feature of the transmitted image, and the value of data equivalent to the data that has become a target of extracting the above bit sequences in the image frame of the original image, thereby to evaluate an image quality of the transmitted image.

The 14th mode of the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising: a bit extraction means for, for predetermined data expressive of an image frame of a decoded image that is obtained by decoding the encoded image, which is obtained before transmission, extracting predetermined bits of which a bit number is fewer than the bit number necessary for expressing the above data per one piece of data; and a feature transmission means for transmitting the value being expressed with bit sequences extracted by said bit extraction means as a feature of said decoded image to an image reception apparatus, being a transmission destination of said encoded image.

The 15th mode of the present invention is characterized in that an image sending apparatus for evaluating an image quality of a transmitted image that is obtained by decoding an encoded image in which an original image has been encoded in a transmission destination thereof, said image sending apparatus encoding an original image and transmitting said encoded image, comprising: a bit extraction means for, for predetermined data expressive of an image frame of a locally-decoded image that is obtained in a course of encoding the original image, extracting predetermined bits of which a bit number is fewer than the bit number necessary for expressing the above data per one piece of data; and a feature transmission means for transmitting the value being expressed with bit sequences extracted by said bit extraction means as a feature of said locally-decoded image to an image reception apparatus, being a transmission destination of said encoded image.

The 16th mode of the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between the original image and the transmitted image based upon the value being expressed with bit sequences that are obtained by extracting predetermined bits for predetermined data expressive of an image frame of said original image, said value received as a feature of the original image, and the value of data equivalent to the data that has become a target of extracting the above bit sequences in the image frame of the transmitted image, thereby to evaluate an image quality of the transmitted image.

The 17th mode of the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising: a bit extraction means for, for predetermined data expressive of an image frame of the transmitted image, extracting predetermined bits of which a bit number is fewer than the bit number necessary for expressing the above data per one piece of data; and a feature transmission means for transmitting the value being expressed with bit sequences extracted by said bit extraction means as a feature of said transmitted image to an image sending apparatus, being a transmission source of said encoded image.

The 18th mode of the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between the decoded image and the transmitted image based upon the value being expressed with bit sequences that are obtained by extracting predetermined bits for predetermined data expressive of an image frame of said decoded image, said value received as a feature of the decoded image that is obtained by decoding the encoded image, which is obtained before transmission, and the value of data equivalent to the data that has become a target of extracting the above bit sequences in the image frame of the transmitted image, thereby to evaluate an image quality of the transmitted image.

The 19th mode of the present invention is characterized in that an image reception apparatus for evaluating an image quality of a transmitted image that is obtained by decoding an encoded image in which an original image has been encoded in a transmission destination thereof, said image reception apparatus obtaining the transmitted image by receiving and decoding the encoded image, comprising an image quality evaluation means for estimating a difference between a locally-decoded image and the transmitted image based upon the value being expressed with bit sequences that are obtained by extracting predetermined bits for predetermined data expressive of an image frame of said locally-decoded image, said value received as a feature of the locally-decoded image that is obtained in a course of encoding the original image, and the value of data equivalent to the data that has become a target of extracting the above bit sequences in the image frame of the transmitted image, thereby to evaluate an image quality of the transmitted image.

The 20th mode of the present invention is characterized in that an image quality evaluation method of evaluating an image quality of an image, comprising: for predetermined data expressive of an image frame of a first image, extracting predetermined bits of which a bit number is fewer than the bit number necessary for expressing the above data per one piece of data; and based upon the value that is expressed with extracted bit sequences, and the value of data equivalent to the data that has become a target of extracting the above bit sequences in a second image, estimating a difference between said first image and said second image, thereby to evaluate the image quality of said first image or second image.

The 21st mode of the present invention is characterized in that, in the above-mentioned modes, an image quality evaluation method as mentioned previously, further comprising, for the predetermined data expressive of the image frame of the first image, extracting continuous predetermined bits of which a bit number is fewer than the bit number necessary for expressing the above data per one piece of data.

The 22nd mode of the present invention is characterized in that, in the above-mentioned mode, in the above-mentioned modes, the image quality evaluation method comprising, for the predetermined data expressive of the image frame of the first image, extracting continuous predetermined bits of which a bit number is fewer than the bit number necessary for expressing the above data per one piece of data except for predetermined high order bits of the above data.

The 23rd mode of the present invention is characterized in that, in the above-mentioned mode, in the above-mentioned modes, the image quality evaluation method comprising, for the predetermined data expressive of the image frame of the first image, extracting continuous predetermined bits of which a bit number is fewer than the bit number necessary for expressing the above data per one piece of data except for predetermined high order bits and predetermined low order bits of the above data.

The 24th mode of the present invention is characterized in that, in the above-mentioned mode, in the above-mentioned modes, the image quality evaluation method comprising employing an average value of pixel information by each of blocks having a predetermined size into which the image frame has been divided as the predetermined data expressive of the image frame.

The 25th mode of the present invention is characterized in that, in the above-mentioned mode, in the above-mentioned modes, the image quality evaluation method comprising employing an average value of an average value of pixel information and an absolute value of a difference between each pixel information and said average value, by each of blocks having a predetermined size into which the image frame has been divided as the predetermined data expressive of the image frame.

The 26th mode of the present invention is characterized in that, in the above-mentioned mode, in the above-mentioned modes, the image quality evaluation method comprising employing a dispersion of pixel information by each of blocks having a predetermined size into which the image frame has been divided as the predetermined data expressive of the image frame.

The 27th mode of the present invention is characterized in that, in the above-mentioned mode, in the above-mentioned modes, an image quality evaluation method comprising employing information of a frequency component of a predetermined position in an aggregation of frequency components that are obtained by subjecting pixel information to an orthogonal transform as the predetermined data expressive of the image frame.

The 28th mode of the present invention is characterized in that, in the above-mentioned mode, in the above-mentioned modes, an image quality evaluation method comprising employing information of a frequency component of a predetermined position in an aggregation of frequency components that are obtained by subjecting pixel information within a block to an orthogonal transform, by each of blocks having a predetermined size into which the image frame has been divided, as the predetermined data expressive of the image frame.

The 29th mode of the present invention is characterized in that, in the above-mentioned mode, in the above-mentioned modes, the image quality evaluation method comprising employing pixel information of a predetermined pixel position as the predetermined data expressive of the image frame.

The 30th mode of the present invention is characterized in that, in the above-mentioned mode, in the above-mentioned modes, the image quality evaluation method, comprising employing the pixel information of the pixels that remain after decimating the pixels within the frame at a constant interval as the predetermined data expressive of the image frame.

The 31st mode of the present invention is characterized in that, in the above-mentioned mode, in the above-mentioned modes, the image quality evaluation method comprising employing the pixel information of the pixels that remain after decimating the pixels within the frame at an interval, said interval being decided depending upon a location within the frame, as the predetermined data expressive of the image frame.

The 32nd mode of the present invention is characterized in that, in the above-mentioned mode, in the above-mentioned modes, the image quality evaluation method comprising controlling a data amount of a feature being transmitted by changing the decimating interval.

The 33rd mode of the present invention is characterized in that, in the above-mentioned mode, in the above-mentioned modes, the pixel information is one of information of brightness, information of a color difference, and an RGB value of the corresponding pixel, or a combination thereof.

The 34th mode of the present invention is characterized in that, in the above-mentioned mode, in the above-mentioned modes, the image quality evaluation method comprising complementing, for the extracted bit sequence, high order bits not extracted at the moment of obtaining the above bit sequence with the value allowing a difference with data equivalent to the data that has become a target of extracting the above bit sequence in the second image to become minimized, thereby to estimate the value of the predetermined data expressive of the image frame of the first image that has become a target of extracting the above bit sequence.

The 35th mode of the present invention is characterized in that, in the above-mentioned mode, in the above-mentioned modes, the image quality evaluation method comprising complementing, for the extracted bit sequence, low order bits not extracted at the moment of obtaining the above bit sequence with an average value of values expressible with the above low order bits, thereby to estimate the value of the predetermined data expressive the image frame of the first image that has become a target of extracting the above bit sequence.

The 36th mode of the present invention is characterized in that, in the above-mentioned mode, in the above-mentioned modes, the image quality evaluation method comprising, from the value obtained by subtracting an average value of an error between the value of the data defined as an estimation result and the actual value of the data, which could occurs due to the low order bits not extracted at the moment of obtaining the bit sequence, from a difference between the value of the predetermined data expressive of the estimated image frame of the first image and the value of data equivalent to said estimated data in a second image, estimating a difference between said first image and said second image.

The 37th mode of the present invention is characterized in that an image quality evaluation method for evaluating the image quality of a transmitted image that is obtained by decoding an encoded image in which an original image has been encoded in a transmission destination thereof the above-mentioned modes: wherein an image sending apparatus for transmitting said encoded image extracts, for the predetermined data expressive of the image frame of the original image, predetermined bits of which a bit number is fewer than the bit number necessary for expressing the above data per one piece of data; and wherein said image sending apparatus transmits the value being expressed with the extracted bit sequences as a feature of said original image to an image reception apparatus, being a transmission destination of said encoded image; and wherein said image reception apparatus for obtaining the transmitted image by receiving and decoding the encoded image estimates a difference between the original image and the transmitted image based upon said value that is expressed with the extracted bit sequences, said value received as a feature of said original image, and the value of data equivalent to the data that has become a target of extracting the above bit sequences in the image frame of the transmitted image, thereby to evaluate the image quality of the transmitted image.

The 38th mode of the present invention is characterized in that an image quality evaluation method for evaluating the image quality of a transmitted image that is obtained by decoding an encoded image in which an original image has been encoded in a transmission destination thereof the above-mentioned modes: wherein an image reception apparatus for obtaining the transmitted image by receiving and decoding the encoded image extracts, for the predetermined data expressive of the image frame of the transmitted image, predetermined bits of which a bit number is fewer than the bit number necessary for expressing the above data per one piece of data; wherein said image reception apparatus transmits the value being expressed with the extracted bit sequences as a feature of said transmitted image to an image sending apparatus, being a transmission source of said encoded image; and wherein said image sending apparatus estimates a difference between the original image and the transmitted image based upon said value that is expressed with the extracted bit sequences, said value received as a feature of said transmitted image, and the value of data equivalent to the data that has become a target of extracting the above bit sequences in the image frame of the original image, thereby to evaluate the image quality of the transmitted image.

The 39th mode of the present invention is characterized in that an image quality evaluation method for evaluating the image quality of a transmitted image that is obtained by decoding an encoded image in which an original image has been encoded in a transmission destination thereof the above-mentioned modes: wherein an image sending apparatus for transmitting the encoded image extracts, for the predetermined data expressive of the image frame of a decoded image that is obtained by decoding the encoded image, which is obtained before transmission, predetermined bits of which a bit number is fewer than the bit number necessary for expressing the above data per one piece of data; wherein said image sending apparatus transmits the value being expressed with the extracted bit sequences as a feature of said decoded image to an image reception apparatus, being a transmission destination of said encoded image; and wherein said image reception apparatus for obtaining the transmitted image by receiving and decoding the encoded image estimates a difference between the decoded image and the transmitted image based upon said value that is expressed with the extracted bit sequences, said value received as a feature of said decoded image, and the value of data equivalent to the data that has become a target of extracting the above bit sequences in the image frame of the transmitted image, thereby to evaluate the image quality of the transmitted image.

The 40th mode of the present invention is characterized in that an image quality evaluation method for evaluating the image quality of a transmitted image that is obtained by decoding an encoded image in which an original image has been encoded in a transmission destination thereof the above-mentioned modes: wherein an image sending apparatus for transmitting the encoded image extracts, for the predetermined data expressive of the image frame of a locally-decoded image that is obtained in a course of encoding the original image, predetermined bits of which a bit number is fewer than the bit number necessary for expressing the above data per one piece of data; wherein said image sending apparatus transmits the value being expressed with the extracted bit sequences as a feature of said locally-decoded image to an image reception apparatus, being a transmission destination of said encoded image; and wherein said image reception apparatus for obtaining the transmitted image by receiving and decoding the encoded image estimates a difference between the locally-decoded image and the transmitted image based upon said value that is expressed with the extracted bit sequences, said value received as a feature of said locally-decoded image, and the value of data equivalent to the data that has become a target of extracting the above bit sequences in the image frame of the transmitted image, thereby to evaluate the image quality of the transmitted image.

The 41st mode of the present invention is characterized in that, in the above-mentioned modes, the image quality evaluation method comprising: complementing, for the extracted bit sequence, the bits not extracted at the moment of obtaining the above bit sequence, thereby to estimate the value of the predetermined data expressive of the image frame of the first image that has become a target of extracting the above bit sequence; and estimating a difference between said first image and said second image from a difference between the value of the predetermined data expressive of the image frame of the estimated first image, and the value of data equivalent to said estimated data in the image frame of the second image.

The 42nd mode of the present invention is characterized in that, in the above-mentioned modes, the image quality evaluation method comprising complementing, for the extracted bit sequence, the bits not extracted at the moment of obtaining the above bit sequence with a pre-decided value, thereby to estimate the value of the predetermined data expressive of the image frame of the first image that has become a target of extracting the above bit sequence.

The 43rd mode of the present invention is characterized in that, in the above-mentioned modes, the image quality evaluation method comprising complementing, for the extracted bit sequence, the bits not extracted at the moment of obtaining the above bit sequence with the value of data equivalent to the data that has become a target of extracting the above bit sequence in the second image, thereby to estimate the value of the predetermined data expressive of the image frame of the first image that has become a target of extracting the above bit sequence.

The 44th mode of the present invention is characterized in that, in the above-mentioned modes, the image quality evaluation method comprising defining the value being expressed with the extracted bit sequence as a feature of the first image, subjecting it to reversible encoding, and transmitting it.

The 45th mode of the present invention is characterized in that, in the above-mentioned modes, the image quality evaluation method of the reversible encoding is arithmetic encoding.

The 46th mode of the present invention is characterized in that, in the above-mentioned modes, the image quality evaluation method of the reversible encoding is JBIG encoding, being a binary image encoding method.

The 47th mode of the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing the processes of: for predetermined data expressive of an image frame of the original image, extracting predetermined bits of which a bit number is fewer than the bit number necessary for expressing the above data per one piece of data; and transmitting the value being expressed with the extracted bit sequences as a feature of said original image to an image reception apparatus, being a transmission destination of said encoded image.

The 48th mode of the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing a process of estimating a difference between the original image and the transmitted image based upon the value being expressed with bit sequences that are obtained by extracting predetermined bits for predetermined data expressive of an image frame of said transmitted image, said value received as a feature of the transmitted image, and the value of data equivalent to the data that has become a target of extracting the above bit sequences in the image frame of the original image, thereby to evaluate the transmitted image.

The 49th mode of the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing the processes of: for predetermined data expressive of an image frame of a decoded image that is obtained by decoding the encoded image, which is obtained before transmission, extracting predetermined bits of which a bit number is fewer than the bit number necessary for expressing the above data per one piece of data; and transmitting the value being expressed with extracted bit sequences as a feature of said decoded image to an image reception apparatus, being a transmission destination of said encoded image.

The 50th mode of the present invention is characterized in that an image quality evaluation program for evaluating an image quality of a transmitted image that is obtained by decoding an encoded image in which an original image has been encoded in a transmission destination thereof, said program being applied for an image sending apparatus for encoding the original image and transmitting said encoded image, causing a computer to executing the processes of: for predetermined data expressive of an image frame of a locally-decoded image that is obtained in a course of encoding the original image, extracting predetermined bits of which a bit number is fewer than the bit number necessary for expressing the above data per one piece of data; and transmitting the value being expressed with extracted bit sequences as a feature of said locally-decoded image to an image reception apparatus, being a transmission destination of said encoded image.

The 51st mode of the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing a process of estimating a difference between the original image and the transmitted image based upon the value being expressed with bit sequences that are obtained by extracting predetermined bits for predetermined data expressive of an image frame of said original image, said value received as a feature of the original image, and the value of data equivalent to the data that has become a target of extracting the above bit sequences in the image frame of the transmitted image, thereby to evaluate an image quality of the transmitted image.

The 52nd mode of the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing the processes of: for predetermined data expressive of an image frame of the transmitted image, extracting predetermined bits of which a bit number is fewer than the bit number necessary for expressing the above data per one piece of data; and transmitting the value being expressed with extracted bit sequences as a feature of said transmitted image to an image sending apparatus, being a transmission source of said encoded image.

The 53rd mode of the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing a process of estimating a difference between a decoded image and the transmitted image based upon the value being expressed with bit sequences that are obtained by extracting predetermined bits for predetermined data expressive of an image frame of said decoded image, said value received as a feature of the decoded image that is obtained by decoding the encoded image, which is obtained before transmission; and the value of data equivalent to the data that has become a target of extracting the above bit sequences in the image frame of the transmitted image, thereby to evaluate an image quality of the transmitted image.

The 54th mode of the present invention is characterized in that an image quality evaluation program for evaluating an image quality of a transmitted image that is obtained by decoding an encoded image in which an original image has been encoded in a transmission destination thereof, said image quality evaluation program being applied for an image reception apparatus for obtaining the transmitted image by receiving and decoding the encoded image, causing a computer to executing a process of estimating a difference between a locally-decoded image and the transmitted image based upon the value being expressed with bit sequences that are obtained by extracting predetermined bits for predetermined data expressive of an image frame of said locally-decoded image, said value received as a feature of the locally-decoded image that is obtained in a course of encoding the original image, and the value of data equivalent to the data that has become a target of extracting the above bit sequences in the image frame of the transmitted image, thereby to evaluate an image quality of the transmitted image.

Above, although the present invention has been particularly described with reference to the preferred embodiments, examples and modes thereof, it should be readily apparent to those of ordinary skill in the art that the present invention is not always limited to the above-mentioned embodiment and examples, and changes and modifications in the form and details may be made without departing from the sprit and scope of the invention.

How the Invention is Capable of Industrial Exploitation

The present invention is preferredly applicable to the system so long as it is such an image quality evaluation system that evaluates a difference between two images with a limited information amount.

The invention claimed is:

1. An image quality evaluation system for evaluating an image quality of an image, comprising:
   a bit extraction unit that, for predetermined data expressive of an image, frame of a first image extracts continuous predetermined bits of which a bit number is fewer than the bit number necessary for expressing the above data per one piece of data except for predetermined high order bits and predetermined low order bits of the above data; and
   an image quality evaluation unit that, based upon the value being expressed with bit sequences extracted by said bit extraction unit, and the value of data equivalent to the data that has become a target of extracting the above bit sequences in a second image, estimates a difference between said first image and said second image, and evaluates the image quality of said first image or second image;
   an image sending apparatus for encoding the original image and transmitting said encoded image, and image reception apparatus for obtaining the transmitted image by receiving said encoded image from said image sending apparatus and decoding it:
   wherein the image sending apparatus comprises:
      a bit extraction unit that, for the predetermined data expressive of the original image, extracts predetermined bits of which a bit number is fewer than the bit number necessary for expressing the above data per one piece of data; and
      a feature transmission unit that transmits the value being expressed with the bit sequences extracted by said bit extraction unit as a feature of said original image to the image reception apparatus, being a transmission destination of said encoded image; and
   wherein the image reception apparatus comprises an image quality evaluation unit that estimates a difference between the original image and the transmitted image based upon the value that is expressed with the bit sequences extracted by said bit sequence extraction unit, said value being received as a feature of said original image, and the value of data equivalent to the data that has become a target of extracting the above bit sequences in the image frame of the transmitted image, thereby to evaluate the image quality of the transmitted image.

2. An image quality evaluation system for evaluating an image quality of an image, comprising:
   a bit extraction unit that, for predetermined data expressive of an image frame of a first image, extracts continuous predetermined bits of which a bit number is fewer than the bit number necessary for expressing the above data per one piece of data except for predetermined high order bits and predetermined low order bits of the above data; and
   an image quality evaluation unit that, based upon the value being expressed with bit sequences extracted by said bit extraction unit, and the value of data equivalent to the data that has become a target of extracting the above bit sequences in a second image, estimates a difference between said first image and said second image, and evaluates the image quality of said first image or second image;
   an image sending apparatus for encoding the original image and transmitting said encoded image, and an image reception apparatus for obtaining the transmitted image by receiving said encoded image from said image sending apparatus and decoding it:
   wherein the image reception apparatus comprises:
      a bit extraction unit that, for the predetermined data expressive of the image frame of the transmitted image, extracts predetermined bits of which a bit number is fewer than the bit number necessary for expressing the above data per one piece of data; and
      a feature transmission unit that transmits the value being expressed with the bit sequences extracted by said bit extraction unit as a feature of said transmitted image to the image sending apparatus, being a transmission source of said encoded image; and wherein the image sending apparatus comprises an image quality evaluation unit that estimates a difference between the original image and the transmitted image based upon the value that is expressed with the bit sequences extracted by said bit sequence extraction unit, said value received as a feature of said transmitted image, and the value of data equivalent to the data that has become a target of extracting the above bit sequences in the image frame of the original image, thereby to evaluate the image quality of the transmitted image.

3. An image quality evaluation system for evaluating an image quality of an image, comprising:
a bit extraction unit that, for predetermined data expressive of an image frame of a first image, extracts continuous predetermined bits of which a bit number is fewer than the bit number necessary for expressing the above data per once piece of data except for predetermined high order bits and predetermined low order bits of the above data;and
an image quality evaluation unit that, based upon the value being expressed with bit sequences extracted by said bit extraction unit, and the value of data equivalent to the data that has become a target of extracting the above bit sequences in a second image, estimates a difference between said first image and said second image, and evaluates the image quality of said first image or second image;
an image sending apparatus for encoding the original image and transmitting said encoded image, and an image reception apparatus for obtaining the transmitted image by receiving said encoded image from said image sending apparatus and decoding it:
wherein the image sending apparatus comprises.
bit extraction unit that, for the predetermined data expressive of the image frame of the decoded image that is obtained by decoding the encoded image without transmitting it, extracts predetermined bits of which a bit number is fewer than the bit number necessary for expressing the above data per one piece of data; and
a feature transmission unit that transmits the value being expressed with the bit sequences extracted by said bit extraction unit as a feature of said decoded image to the image reception apparatus, being a transmission destination of said encoded image; and
wherein the image reception apparatus comprises an image quality evaluation unit that estimates a difference between the decoded image and the transmitted image based upon the value that is expressed with the bit sequences extracted by said bit sequence extraction unit, said value received as a feature of said decoded image, and the value of data equivalent to the data that has become a target of extracting the above bit sequences in the image frame of the transmitted image, thereby to evaluate the image quality of the transmitted image.

4. An image quality evaluation system for evaluating an image quality of an image, comprising:
bit extraction unit that, for predetermined data expressive of an image frame of a first image extracts continuous predetermined bits of which a bit number is fewer than the bit number necessary for expressing the above data per one piece of data except for predetermined high order bits and predetermined low order bits of the above data; and
an image quality evaluation unit that, based upon the value being expressed with bit sequences extracted by said bit extraction unit, and the value of data equivalent to the data that has become a target of extracting the above bit sequences in a second image, estimates a difference between said first image and said second image, and evaluates the image quality of said first image or second image;
an image sending apparatus for encoding the original image and transmitting said encoded image, and an image reception apparatus for obtaining the transmitted image by receiving said encoded image from said image sending apparatus and decoding it:
wherein the image sending apparatus comprises:
a bit extraction unit that, for the predetermined data expressive of the image frame of a locally-decoded image that is obtained in a course of encoding the original image, extracts predetermined bits of which a bit number is fewer than the bit number necessary for expressing the above data per one piece of data; and
a feature transmission unit that transmits the value being expressed with the bit sequences extracted by said bit extraction unit as a feature of said locally decoded image to the image reception apparatus, being a transmission destination of said encoded image; and
wherein the image reception apparatus comprises an image quality evaluation unit that estimates a difference between the locally-decoded image and the transmitted image based upon the value that is expressed with the bit sequences extracted by said bit sequence extraction unit, said value received as a feature of said locally-decoded image, and the value of data equivalent to the data that has become a target of extracting the above bit sequences in the image frame of the transmitted image, thereby to evaluate the image quality of he transmitted image.

5. An image quality evaluation method of evaluating an image quality of an image, comprising:
for predetermined data expressive of an image frame of a first image, extracting continuous predetermined bits of which a bit number is fewer than the bit number necessary for expressing the above data per one piece of data except for predetermined high order bits and predetermined low order bits of the above data;
based upon the value that is expressed with extracted bit sequences, and the value of data equivalent to the data that has become a target of extracting the above bit sequences in a second image, estimating a difference between said first image and said second image, thereby to evaluate the image quality of said first image or second image; and
complementing, for the extracted bit sequence, high order bits not extracted at the moment of obtaining the above bit sequence with the value allowing a difference with data equivalent to the data that has become a target of extracting the above bit sequence in the second image to become minimized, thereby to estimate the value of the predetermined data expressive of the image frame of the first image that has become a target of extracting the above bit sequence.

6. An image quality evaluation method of evaluating an image quality of an image, comprising:
for predetermined data expressive of an image frame of a first image, extracting continuous predetermined bits of which a bit number is fewer than the bit number necessary for expressing the above data per one piece of data except for predetermined high order bits and predetermined low order bits of the above data;
based upon the value that is expressed with extracted bit sequences, and the value of data equivalent to the data that has become a target of extracting the above bit sequences in a second image, estimating a difference between said first image and said second image, thereby to evaluate the image quality of said first image or second image; and complementing, for the extracted bit sequence, low order bits not extracted at the moment of obtaining the above bit sequence with an average value of values expressible with the above low order bits, thereby to estimate the value of the predetermined data expressive the image frame of the first image that has become a target of extracting the above bit sequence.

7. An image quality evaluation method of evaluating an image quality of an image, comprising:

for predetermined data expressive of an image frame of a first image, extracting continuous predetermined bits of which a bit number is fewer than the bit number necessary for expressing the above data per one piece of data except for predetermined high order bits and predetermined low order bits of the above data;

based upon the value that is expressed with extracted bit sequences, and the value of data equivalent to the data that has become a target of extracting the above bit sequences in a second image, estimating a difference between said first image and said second image, thereby to evaluate the image quality of said first image or second image; and from the value obtained by subtracting an average value of an error between the value of the data defined as an estimation result and the actual value of the data, which could occurs due to the low order bits not extracted at the moment of obtaining the bit sequence, from a difference between the value of the predetermined data expressive of the estimated image frame of the first image and the value of data equivalent to said estimated data in a second image, estimating a difference between said first image and said second image.

8. An image quality evaluation method of evaluating an image quality of an image, comprising:

for predetermined data expressive of an image frame of a first image, extracting continuous predetermined bits of which a bit number is fewer than the bit number necessary for expressing the above data per one piece of data except for predetermined high order bits and predetermined low order bits of the above data;

based upon the value that is expressed with extracted bit sequences, and the value of data equivalent to the data that has become a target of extracting the above bit sequences in a second image, estimating a difference between said first image and said second image, thereby to evaluate the image quality of said first image or second image; and wherein an image sending apparatus for transmitting said encoded image extracts, for the predetermined data expressive of the image frame of the original image, predetermined bits of which a bit number is fewer than the bit number necessary for expressing the above data per one piece of data; and wherein said image sending apparatus transmits the value being expressed with the extracted bit sequences as a feature of said original image to an image reception apparatus, being a transmission destination of said encoded image; and wherein said image reception apparatus for obtaining the transmitted image by receiving and decoding the encoded image estimates a difference between the original image and the transmitted image based upon said value that is expressed with the extracted bit sequences, said value received as a feature of said original image, and the value of data equivalent to the data that has become a target of extracting the above bit sequences in the image frame of the transmitted image, thereby to evaluate the image quality of the transmitted image.

9. An image quality evaluation method of evaluating an image quality of an image, comprising:

for predetermined data expressive of an image frame of a first image, extracting continuous predetermined bits of which a bit number is fewer than the bit number necessary for expressing the above data per one piece of data except for predetermined high order bits and predetermined low order bits of the above data;

based upon the value that is expressed with extracted bit sequences, and the value of data equivalent to the data that has become a target of extracting the above bit sequences in a second image, estimating a difference between said first image and said second image, thereby to evaluate the image quality of said first or second image; and wherein an image reception apparatus for obtaining the transmitted image by receiving and decoding the encoded image extracts, for the predetermined data expressive of the image frame of the transmitted image, predetermined bits of which a bit number is fewer than the bit number necessary for expressing the above data per one piece of data;

wherein said image reception apparatus transmits the value being expressed with the extracted bit sequences as a feature of said transmitted image to an image sending apparatus, being a transmission source of said encoded image; and wherein said image sending apparatus estimates a difference between the original image and the transmitted image based upon said value that is expressed with the extracted bit sequences, said value received as a feature of said transmitted image, and the value of data equivalent to the data that has become a target of extracting the above bit sequences in the image frame of the original image, thereby to evaluate the image quality of the transmitted image.

10. An image quality evaluation method of evaluating an image quality of an image, comprising:

for predetermined data expressive of an image frame of a first image, extracting continuous predetermined bits of which a bit number is fewer than the bit number necessary for expressing the above data per one piece of data except for predetermined high order bits and predetermined low order bits of the above data;

based upon the value that is expressed with extracted bit sequences, and the value of data equivalent to the data that has become a target of extracting the above bit sequences in a second image, estimating a difference between said first image and said second image, thereby to evaluate the image quality of said first image or second image; and wherein an image sending apparatus for transmitting the encoded image extracts, for the predetermined data expressive of the image frame of a decoded image that is obtained by decoding the encoded image, which is obtained before transmission, predetermined bits of which a bit number is fewer than the bit number necessary for expressing the above data per one piece of data;

wherein said image sending apparatus transmits the value being expressed with the extracted bit sequences as a feature of said decoded image to an image reception apparatus, being a transmission destination of said encoded image; and wherein said image reception apparatus for obtaining the transmitted image by receiving and decoding the encoded image estimates a difference between the decoded image and the transmitted image based upon said value that is expressed with the extracted bit sequences, said value received as a feature of said decoded image, and the value of data equivalent to the data that has become a target of extracting the above bit sequences in the image frame of the transmitted image, thereby to evaluate the image quality of the transmitted image.

11. An image quality evaluation method of evaluating an image quality of an image, comprising:

for predetermined data expressive of an image frame of a first image, extracting continuous predetermined bits of which a bit number is fewer than the bit number necessary for expressing the above data per one piece of data except for predetermined high order bits and predetermined low order bits of the above data;

based upon the value that is expressed with extracted bit sequences, and the value of data equivalent to the data that has become a target of extracting the above bit sequences in a second image, estimating a difference between said first image and said second image, thereby to evaluate the image quality of said first image or second image; and wherein an image sending apparatus for transmitting the encoded image extracts, for the predetermined data expressive of the image frame of a locally-decoded image that is obtained in a course of encoding the original image, predetermined bits of which a bit number is fewer than the bit number necessary for expressing the above data per one piece of data;

wherein said image sending apparatus transmits the value being expressed with the extracted bit sequences as a feature of said locally-decoded image to an image reception apparatus, being a transmission destination of said encoded image; and wherein said image reception apparatus for obtaining the transmitted image by receiving and decoding the encoded image estimates a difference between the locally-decoded image and the transmitted image based upon said value that is expressed with the extracted bit sequences, said value received as a feature of said locally-decoded image, and the value of data equivalent to the data that has become a target of extracting the above bit sequences in the image frame of the transmitted image, thereby to evaluate the image quality of the transmitted image.

12. An image quality evaluation method of evaluating an image quality of an image, comprising:

for predetermined data expressive of an image frame of a first image, extracting continuous predetermined bits of which a bit number is fewer than the bit number necessary for expressing the above data per one piece of data except for predetermined high order bits and predetermined low order bits of the above data;

based upon the value that is expressed with extracted bit sequences, and the value of data equivalent to the data that has become a target of extracting the above bit sequences in a second image, estimating a difference between said first image and said second image, thereby to evaluate the image quality of said first image or second image; and complementing, for the extracted bit sequence, the bits not extracted at the moment of obtaining the above bit sequence, thereby to estimate the value of the predetermined data expressive of the image frame of the first image that has become a target of extracting the above bit sequence; and estimating a difference between said first image and said second image from a difference between the value of the predetermined data expressive of the image frame of the estimated first image, and the value of data equivalent to said estimated data in the image frame of the second image.

13. An image quality evaluation method according to claim 12, comprising complementing, for the extracted bit sequence, the bits not extracted at the moment of obtaining the above bit sequence with a pre-decided value, thereby to estimate the value of the predetermined data expressive of the image frame of the first image that has become a target of extracting the above bit sequence.

14. An image quality evaluation method according to claim 12, comprising complementing, for the extracted bit sequence, the bits not extracted at the moment of obtaining the above bit sequence with the value of data equivalent to the data that has become a target of extracting the above bit sequence in the second image, thereby to estimate the value of the predetermined data expressive of the image frame of the first image that has become a target of extracting the above bit sequence.

* * * * *